(12) United States Patent
Gundel et al.

(10) Patent No.: US 9,551,439 B2
(45) Date of Patent: Jan. 24, 2017

(54) WIRE MANAGEMENT ARTICLE

(75) Inventors: Douglas B. Gundel, Cedar Park, TX (US); Gerard A. Beauchesne, Austin, TX (US); David F. Slama, Grant, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 922 days.

(21) Appl. No.: 13/148,405

(22) PCT Filed: Mar. 15, 2010

(86) PCT No.: PCT/US2010/027292
§ 371 (c)(1),
(2), (4) Date: Aug. 8, 2011

(87) PCT Pub. No.: WO2010/117558
PCT Pub. Date: Oct. 14, 2010

(65) Prior Publication Data
US 2012/0006947 A1    Jan. 12, 2012

Related U.S. Application Data

(60) Provisional application No. 61/164,636, filed on Mar. 30, 2009.

(51) Int. Cl.
*F16L 3/06* (2006.01)
*F16L 3/223* (2006.01)
*H02G 3/30* (2006.01)

(52) U.S. Cl.
CPC ................. *F16L 3/223* (2013.01); *H02G 3/30* (2013.01); *F16L 3/06* (2013.01)

(58) Field of Classification Search
USPC ........... 248/65, 68.1, 70, 74.2; 174/21 R, 24, 174/68.1, 100; 24/306, 335, 339, 341, 24/129 R, 115 A, 115 R
See application file for complete search history.

(56) References Cited

U.S. PATENT DOCUMENTS

| | | | | |
|---|---|---|---|---|
| 3,854,482 A | * | 12/1974 | Laugherty et al. | ............ 606/120 |
| 4,195,194 A | * | 3/1980 | Kuster et al. | .................... 174/59 |
| 4,300,284 A | | 11/1981 | Reeder | |
| 4,825,540 A | | 5/1989 | Kelly | |
| 5,149,280 A | | 9/1992 | Edgley et al. | |
| 5,389,082 A | * | 2/1995 | Baugues et al. | .............. 604/174 |

(Continued)

FOREIGN PATENT DOCUMENTS

| | | |
|---|---|---|
| JP | 2002-051428 | 2/2002 |
| KR | 2003-0010439 | 2/2003 |
| WO | WO 2008/033997 A1 | 3/2008 |

OTHER PUBLICATIONS

Search Report for PCT/US2010/027292, pp. 3.
Written Opinion of the ISA for International Application No. PCT/US2010/027292, pp. 4.

*Primary Examiner* — Alfred J Wujciak
(74) *Attorney, Agent, or Firm* — Robert S. Moshrefzadeh

(57) ABSTRACT

A wire management article includes a base sheet and a plurality of wire management elements. The base sheet has a major surface from which the wire management elements project. The wire management elements define a plurality of channels. Each channel is configured to retain at least one wire. The wire management article may include a cover sheet releasably attached to the base sheet. The wire management article may be part of a wire management system.

3 Claims, 23 Drawing Sheets

(56) References Cited

U.S. PATENT DOCUMENTS

| | | |
|---|---|---|
| 5,402,974 A | 4/1995 | Adams |
| 5,535,969 A * | 7/1996 | Duffy, Jr. .................... 248/68.1 |
| 5,713,912 A * | 2/1998 | Porter .......................... 606/158 |
| 5,800,187 A | 9/1998 | Vermon et al. |
| 6,027,368 A | 2/2000 | Daoud |
| 6,190,249 B1 * | 2/2001 | Karubian ..................... 452/176 |
| 6,367,128 B1 | 4/2002 | Galkiewicz et al. |
| 6,484,371 B1 | 11/2002 | Romanko et al. |
| D472,457 S * | 4/2003 | Fenton et al. ................ D8/394 |
| 6,546,604 B2 | 4/2003 | Galkiewicz et al. |
| 6,588,074 B2 | 7/2003 | Galkiewicz et al. |
| 6,763,556 B2 * | 7/2004 | Fagan et al. ................ 24/584.1 |
| 6,917,746 B2 | 7/2005 | Simmons et al. |
| 2003/0089515 A1 | 5/2003 | Federspiel et al. |
| 2006/0048346 A1 * | 3/2006 | Soumi ......................... 24/115 R |
| 2007/0215757 A1 * | 9/2007 | Yuta ..................... F16L 55/035 248/68.1 |
| 2007/0261874 A1 | 11/2007 | Pagoto et al. |
| 2008/0011512 A1 | 1/2008 | Burns |
| 2008/0121763 A1 | 5/2008 | Mori et al. |

\* cited by examiner

WIRE MANAGEMENT ARTICLE

CROSS REFERENCE TO RELATED APPLICATIONS

This application is a national stage filing under 35 U.S.C. 371 of PCT/US2010/027292, filed 15 Mar. 2010, which claims priority to U.S. Application No. 61/164,636, filed 30 Mar. 2009, the disclosure of which is incorporated by reference in its/their entirety herein.

TECHNICAL FIELD

The present invention relates to a wire management article and, more particularly, to a wire management article including structural elements that project from a base layer for holding a plurality of discrete wires in a side-by-side relationship.

BACKGROUND

Articles for identifying and organizing wires used, e.g., to route signals or power between electrical devices, are known in the art. For example, it is known in the art to use wire ties to route and group wires. These wire ties wrap around a group of wires but provide no further organization and do not allow for ease of identification and removal or addition of a single wire. For example, when a single wire needs to be removed or traced during installation or debug of an electrical system routing a large number of parallel wires, the installer must either unthread the group of wires from a number of wire ties or destroy the wire ties. After this, the installer will have to re-thread the group of wires or install new wire ties resulting in additional time, effort, cost, and waste.

Although many useful articles have been developed to identify and organize wires, there is still a need in the art for a wire management article that is inexpensive, reliable, and provides identification, organization, separation, protection, design flexibility, and ease of access and removal to a group of wires without destruction of the article or the wires or a laborious unthreading/re-threading process.

SUMMARY

In one aspect, the invention described herein provides a wire management article including a base sheet and a plurality of wire management elements. The base sheet has a major surface from which the wire management elements project. The wire management elements define a plurality of channels. Each channel is configured to retain at least one wire.

The above summary of the present invention is not intended to describe each disclosed embodiment or every implementation of the present invention. The Figures and detailed description that follow below more particularly exemplify illustrative embodiments.

DETAILED DESCRIPTION

In the following detailed description of the preferred embodiments, reference is made to the accompanying drawings that form a part hereof. The accompanying drawings show, by way of illustration, specific embodiments in which the invention may be practiced. In this regard, directional terminology, such as "top," "bottom," "front," "back," "leading," "trailing," etc., is used with reference to the orientation of the Figure(s) being described. Because elements of embodiments of the present invention can be positioned in a number of different orientations, the directional terminology is used for purposes of illustration and is in no way limiting. It is to be understood that other embodiments may be utilized, and structural or logical changes may be made without departing from the scope of the present invention. The following detailed description, therefore, is not to be taken in a limiting sense, and the scope of the invention is defined by the appended claims.

Figure 1:
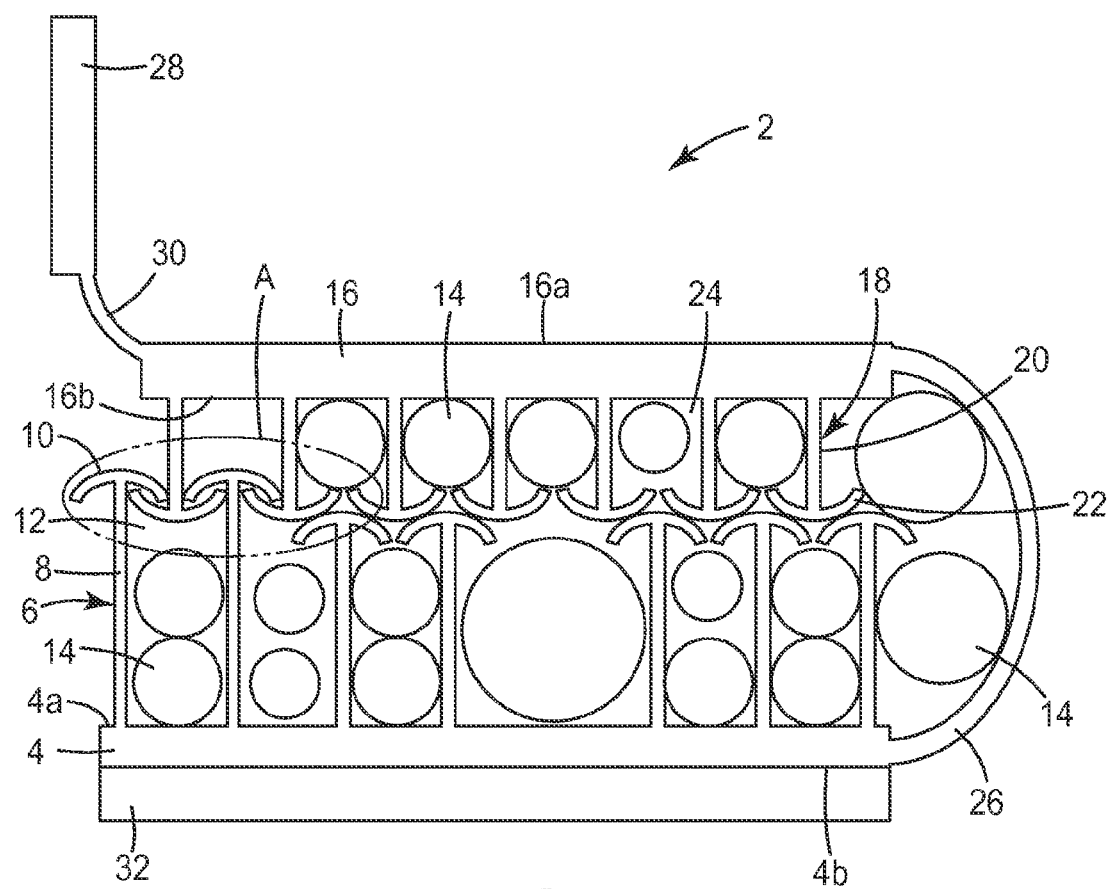
FIG. 1 is a schematic side view of an exemplary embodiment of a wire management article according to an aspect of the present invention.

FIG. 1 illustrates an exemplary embodiment of a wire management article according to an aspect of the present invention. Wire management article 2 includes a base sheet 4 and a plurality of first wire management elements 6. First wire management elements 6 project from a top surface 4*a* of base sheet 4. Each first wire management element 6 includes a first stem portion 8 and a first head portion 10. First stem portion 8 is attached to and generally upright from base sheet 4. First head portion 10 is spaced from top surface 4*a* of base sheet 4 and extends generally laterally from first stem portion 8. First wire management elements 6 define a plurality of first channels 12. Each first channel 12 is configured to retain at least one wire 14. A wire is defined herein as any elongated object the path or shape of which may need to be managed, including but not limited to an electrical wire, a single wire electrical cable (e.g., single coaxial or single twinaxial), a multiple wire electrical cable (e.g., multiple coaxial, multiple twinaxial, or twisted pair), a light fiber, and a pneumatic or hydraulic tube. The elongated object may have any suitable cross-sectional shape, including but not limited to a curvilinear shape and a rectilinear shape. Wire management article 2 further includes a cover sheet 16 and a plurality of second wire management elements 18. One of the functions of cover sheet 16 is to protect first wire management elements 6 and wires 14 retained therebetween, e.g., when wire management article 2 is in use. Second wire management elements 18 project from a bottom surface 16b of cover sheet 16. Each second wire management element 18 includes a second stem portion 20 and a second head portion 22. Second stem portion 20 is attached to and generally upright from cover sheet 16. Second head portion 22 is spaced from bottom surface 16b of cover sheet 16 and extends generally laterally from second stem portion 20. Second wire management elements 18 define a plurality of second channels 24. Each second channel 24 is configured to retain at least one wire 14. Cover sheet 16 is releasably attached to base sheet 4 by interlocking at least one of first wire management elements 6 and at least one of second wire management elements 18, as shown in area A of FIG. 1. Cover sheet 16 is integrally formed with base sheet 4 and includes a cover sheet hinge portion 26 connecting cover sheet 16 to base sheet 4. Cover sheet 16 further includes a pull tab 28 configured to remove cover sheet 16 from base sheet 4. Pull tab 28 is integrally formed with cover sheet 16 and includes a pull tab hinge portion 30 connecting pull tab 28 to cover sheet 16. Wire management article 2 further includes an adhesive layer 32 attached to a bottom surface 4b of base sheet 4. Adhesive layer 32 functions to attach wire management article 2 to a support, which is described in more detail below. As shown in FIG. 1, wires 14 may be placed between hinge portion 26 and first wire management elements 6 and/or second wire management elements 18. Wires 14 may be placed generally between base sheet 4 and cover sheet 16 and held in place by interlocking at least one of first wire management elements 6 and at least one of second wire management elements 18.

The various elements of wire management article 2 briefly introduced above are described in more detail in the following exemplary embodiments of a wire management article according to an aspect of the present invention.

Figure 2A:
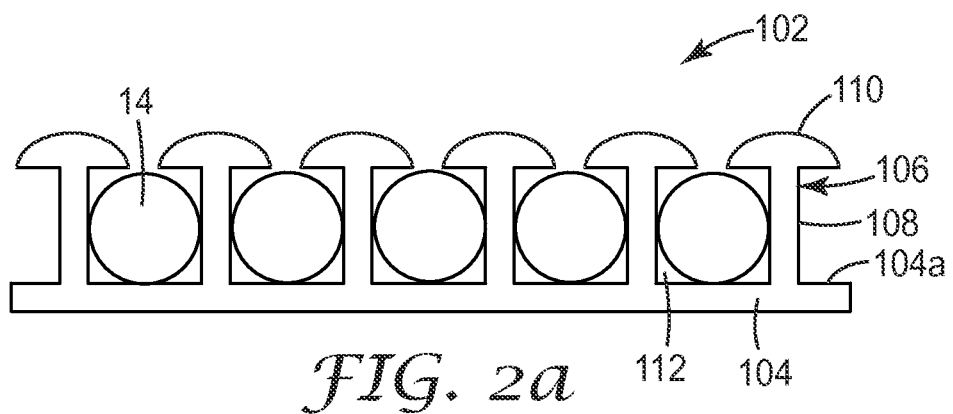
FIGS. 2*a*-2*b*, 3*a*-3*b*, and 4*a*-4*b* are schematic side and top views respectively of three other exemplary embodiments of a wire management article according to an aspect of the present invention.
Figure 2B:
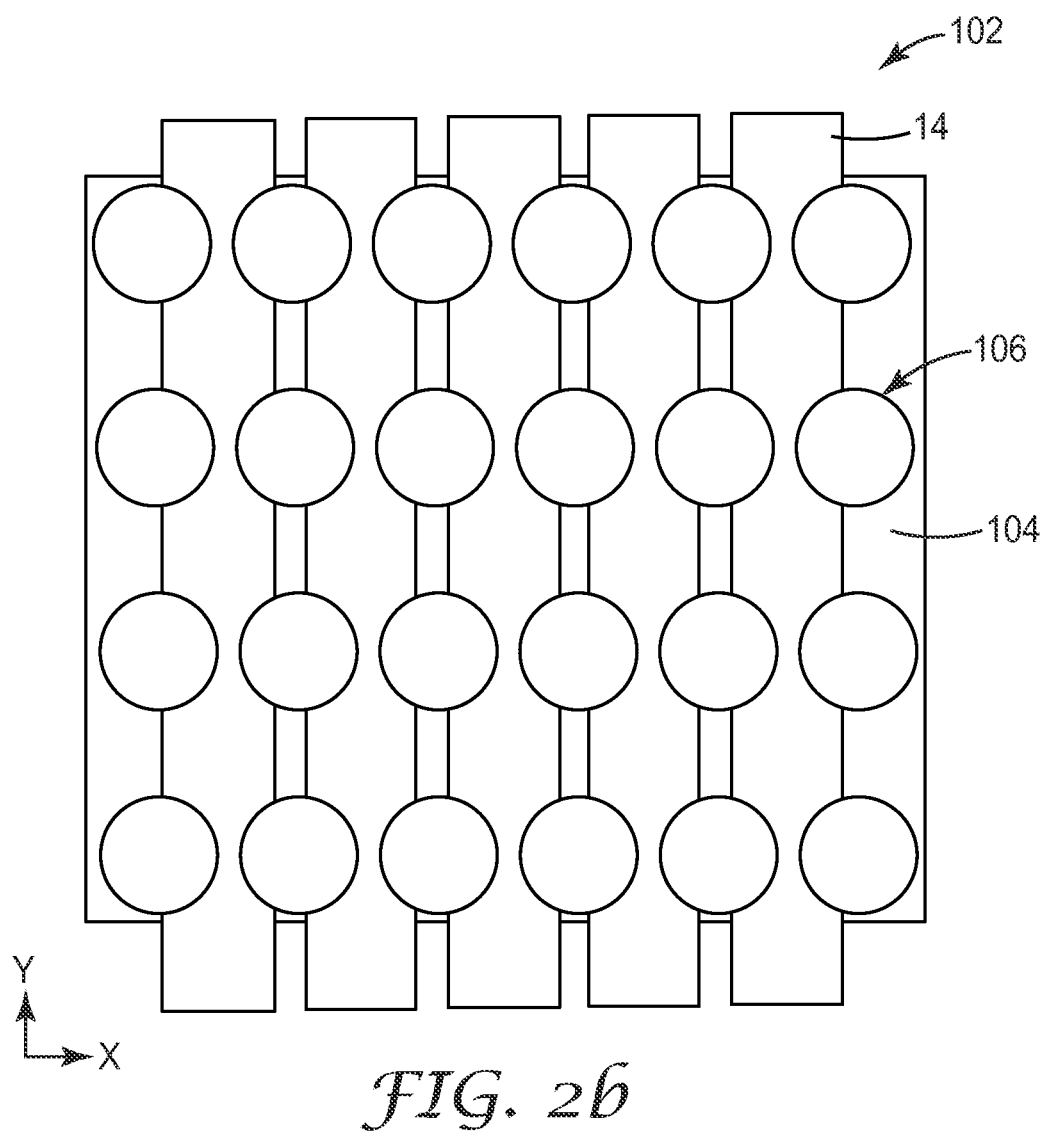

FIGS. 2a and 2b illustrate another exemplary embodiment of a wire management article according to an aspect of the present invention. Wire management article 102 includes a base sheet 104 and a plurality of posts 106. Posts 106 project from a top surface 104a of base sheet 104. Each post 106 includes a stem portion 108 and a head portion 110. Stem portion 108 is attached to and generally upright from base sheet 104. Head portion 110 is spaced from top surface 104a of base sheet 104 and extends generally laterally from stem portion 108. Posts 106 define a plurality of channels 112. Each channel 112 is configured to retain at least one wire 14.

In the exemplary embodiment of FIGS. 2a and 2b, as best shown in FIG. 2b, posts 106 are positioned in an array, including a number of rows (in x-direction) and columns (in y-direction), wherein the spacing between the rows is different from the spacing between the columns. In other embodiments, the posts may be positioned in an array wherein the spacing between the rows is substantially the same as the spacing between the columns, or any other suitable arrangement, including but not limited to a staggered or random arrangement, to accommodate suitable organization, positioning, and/or retention of wires.

In the exemplary embodiment of FIGS. 2a and 2b, as best shown in FIG. 2a, stem portion 108 and head portion 110 define a generally mushroom-shaped post. In other embodiments, the stem portion and the head portion may define any other generally axisymmetric post or a post of any other suitable shape to accommodate suitable positioning and/or retention of wires.

Figure 3A:
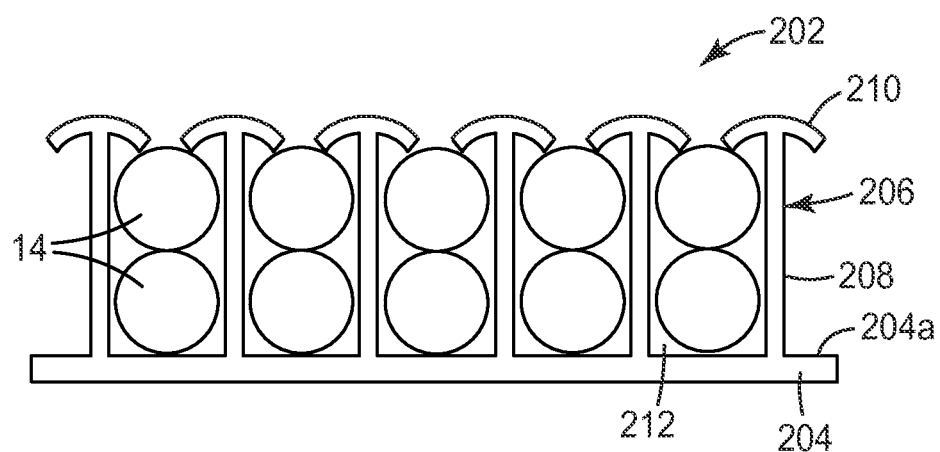
Figure 3B:
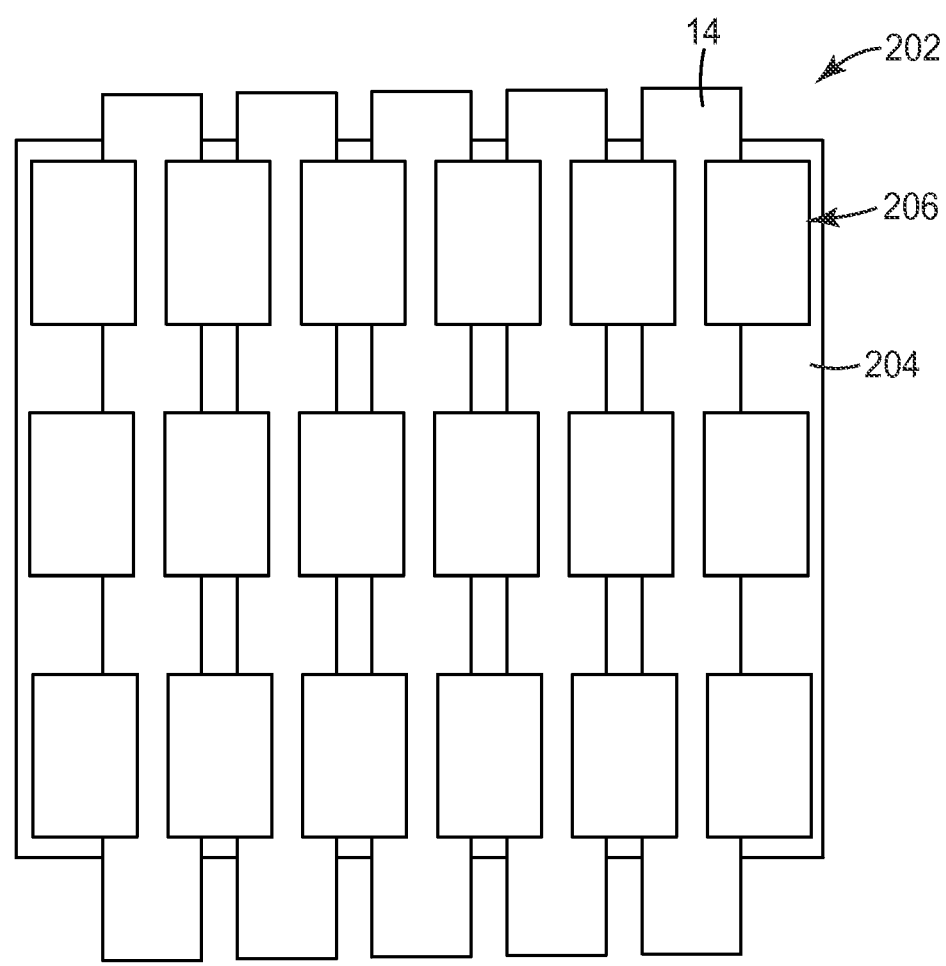

FIGS. 3a and 3b illustrate another exemplary embodiment of a wire management article according to an aspect of the present invention. Wire management article 202 includes a base sheet 204 and a plurality of generally parallel elongated ridges 206. Ridges 206 project from a top surface 204a of base sheet 204. Each ridge 206 includes a stem portion 208 and a head portion 210. Stem portion 208 is attached to and generally upright from base sheet 204. Head portion 210 is spaced from top surface 204a of base sheet 204 and extends generally laterally from stem portion 208. Ridges 206 define a plurality of channels 212. Each channel 212 is configured to retain at least two wires 14 in a stacked arrangement. In the exemplary embodiment of FIGS. 3a and 3b, as best shown in FIG. 3b, ridges 206 are discontinuous.

Figure 4A:
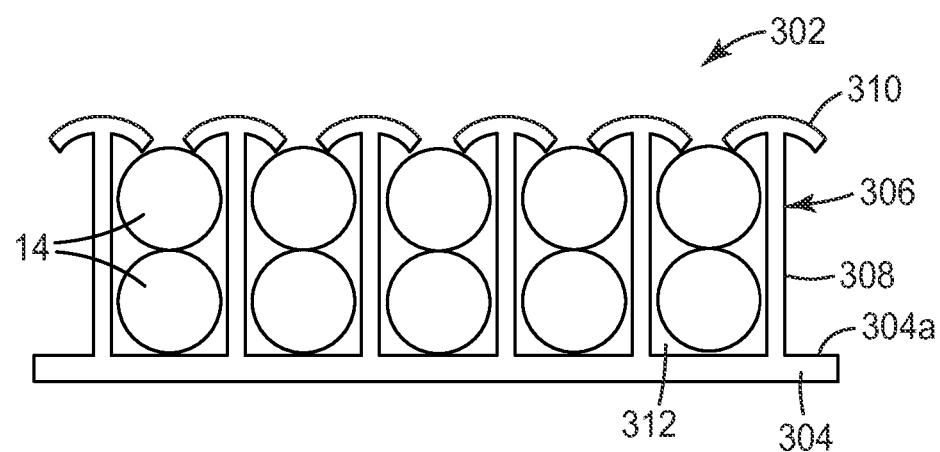
Figure 4B:
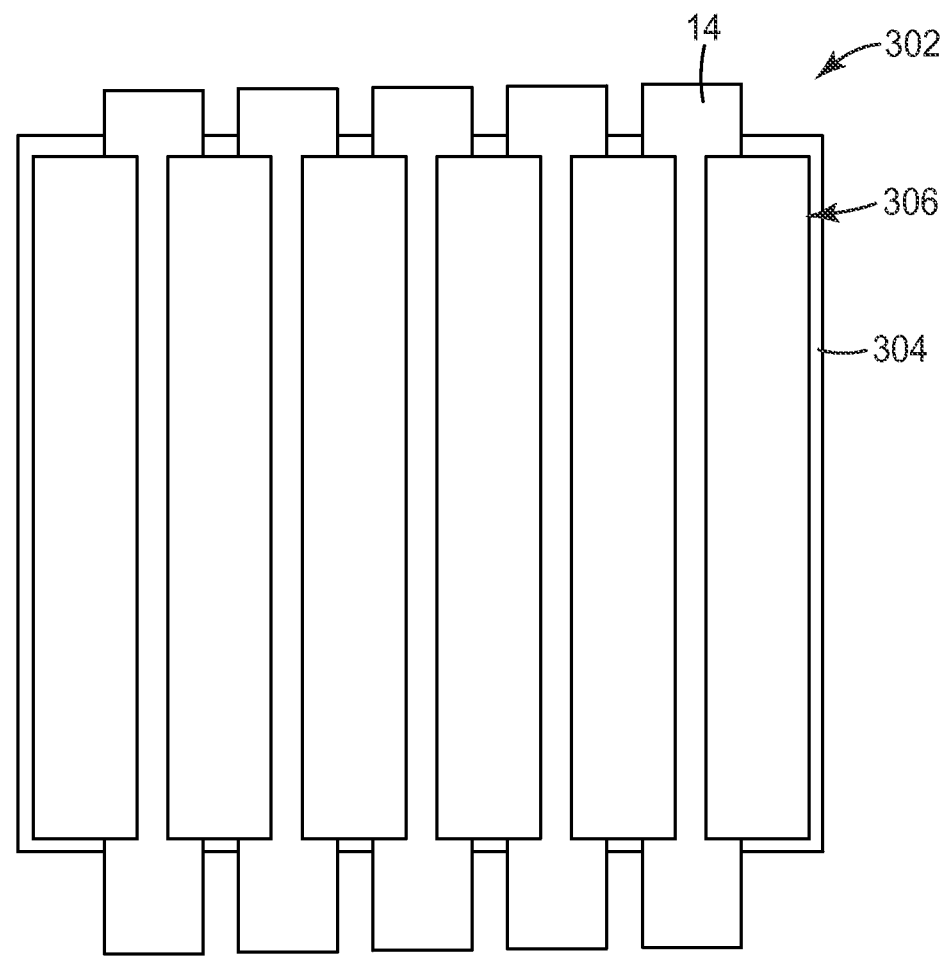

FIGS. 4a and 4b illustrate another exemplary embodiment of a wire management article according to an aspect of the present invention. Wire management article 302 includes a base sheet 304 and a plurality of generally parallel elongated ridges 306. Ridges 306 project from a top surface 304a of base sheet 304. Each ridge 306 includes a stem portion 308 and a head portion 310. Stem portion 308 is attached to and generally upright from base sheet 304. Head portion 310 is spaced from top surface 304a of base sheet 304 and extends generally laterally from stem portion 308. Ridges 306 define a plurality of channels 312. Each channel 312 is configured to retain at least two wires 14 in a stacked arrangement. In the exemplary embodiment of FIGS. 4a and 4b, as best shown in FIG. 4b, ridges 306 are continuous.

The wire management elements (including posts and ridges) of exemplary embodiments of a wire management article according to an aspect of the present invention may be shaped in a large variety of designs to accommodate the intended application. Examples of possible designs are illustrated in FIGS. 5a-5j. Generally, each design of wire management element 406 (shown in FIGS. 5a-5j as 406a-406j, respectively) includes a stem portion 408 (shown in FIGS. 5a-5j as 408a-408j, respectively) and a head portion 410 (shown in FIGS. 5a-5j as 410a-410j, respectively). Stem portion 408 is attached to and generally upright from base sheet 404. Head portion 410 is spaced from top surface 404a of base sheet 404 and extends generally laterally from stem portion 408. Wire management elements 406 define a plurality of channels 412 (shown in FIGS. 5a-5j as 412a-412j, respectively) shaped accordingly. Both the design and relative position of wire management elements 406 define the shape and size of channels 412. The design and relative position of wire management elements 406 may vary within a single wire management article as is suitable for the intended application.

Figure 5A:
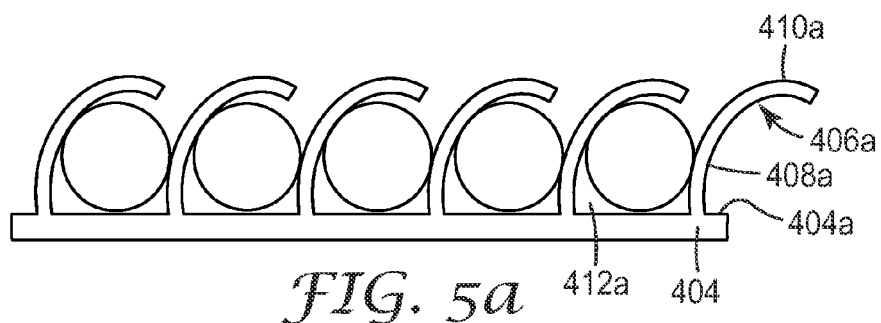
FIGS. 5*a*-5*j* are schematic side views of various exemplary embodiments of wire management elements that can be used in a wire management article according to an aspect of the present invention.
Figure 5B:
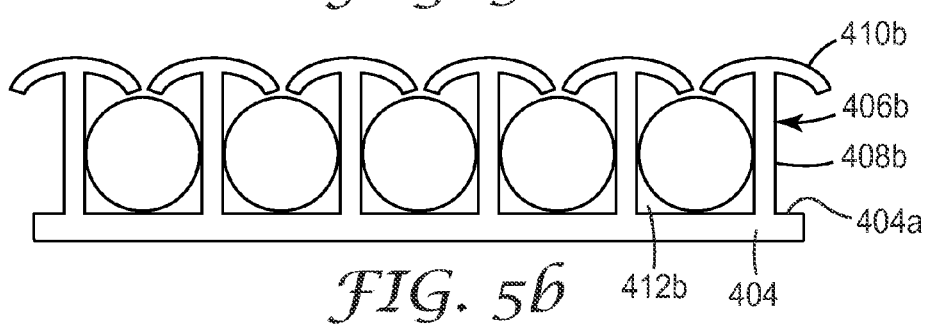
Figure 5C:
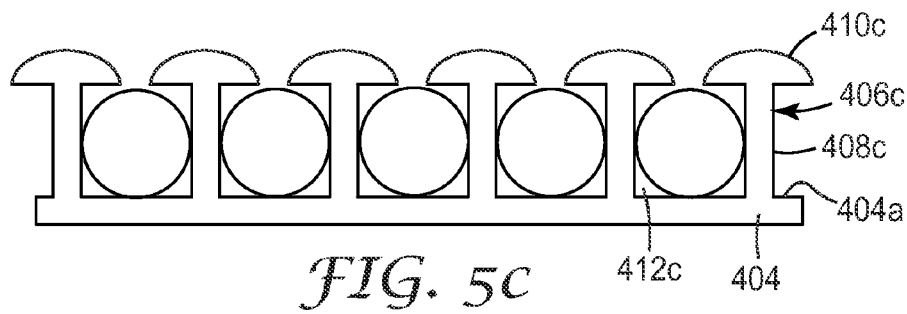
Figure 5D:
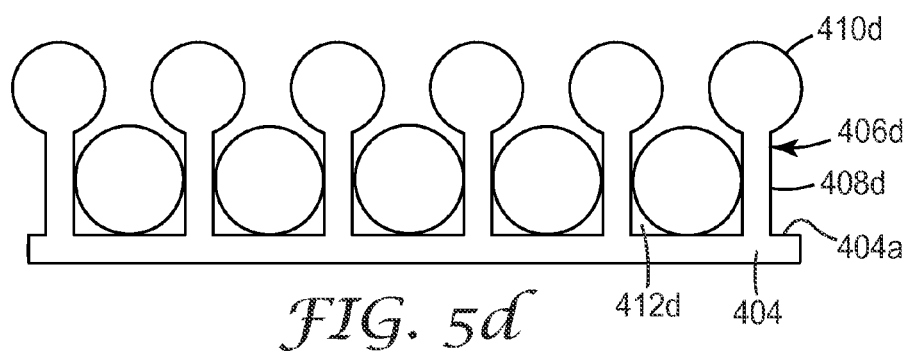
Figure 5E:
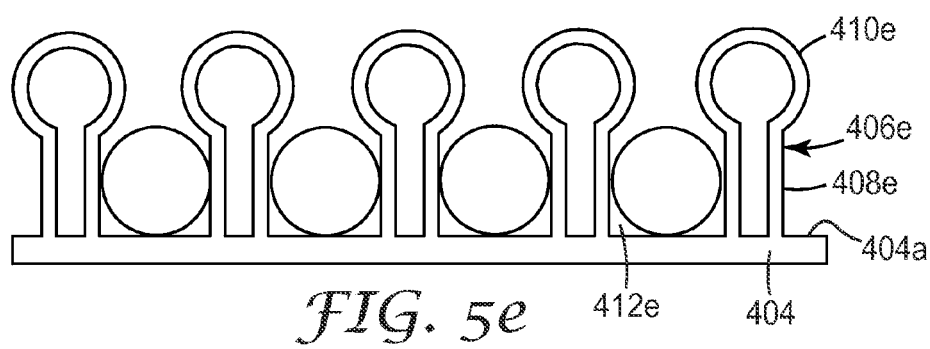
Figure 5F:
Figure 5G:
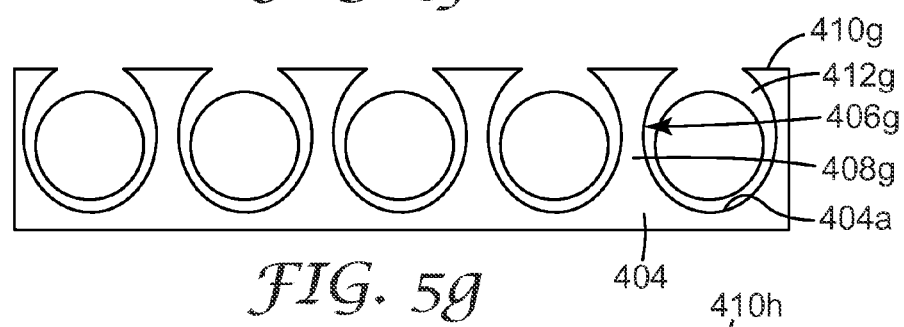
Figure 5H:
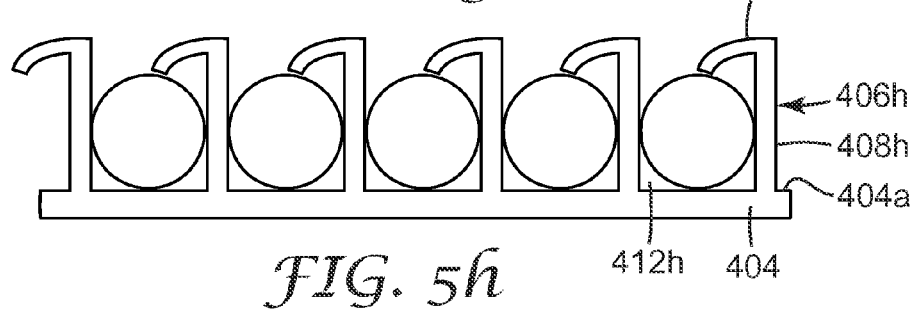
Figure 5I:
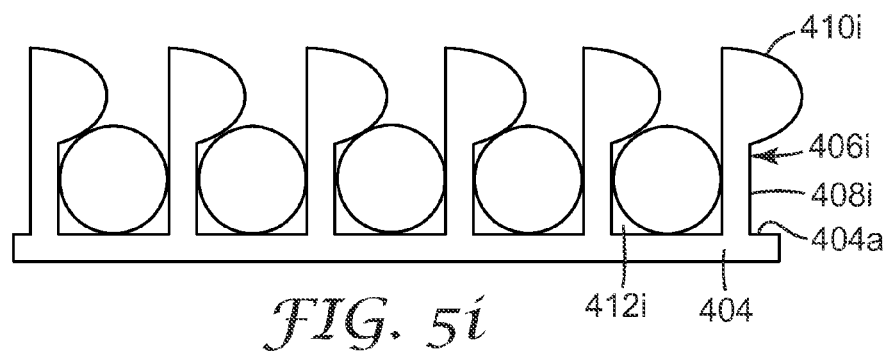
Figure 5J:
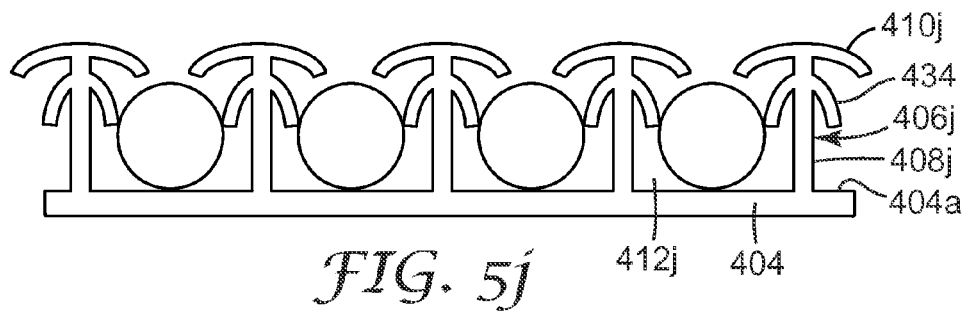

In FIG. 5a, stem portion 408a and head portion 410a define a generally curvilinear ridge 406a. Generally curvilinear ridges 406a define a plurality of channels 412a having a generally curvilinear shape. In FIG. 5b, head portion 410b has a generally curvilinear shape and extends from stem portion 408b curving toward base sheet 404. This design may be applied, e.g., to an axisymmetric post or an elongated ridge. Axisymmetric posts or elongated ridges 406b define a plurality of channels 412b having a generally rectilinear shape. In FIG. 5c, head portion 410c has a generally partially circular shape. This design may be applied, e.g., to an axisymmetric post or an elongated ridge. When applied to an axisymmetric post, stem portion 408c and head portion 410c define a generally mushroom-shaped post. Axisymmetric posts or elongated ridges 406c define a plurality of channels 412c having a generally rectilinear shape. In FIG. 5d, head portion 410d has a generally circular shape. This design may be applied, e.g., to an axisymmetric post or an elongated ridge. When applied to an axisymmetric post, head portion 410d is generally ball-shaped. When applied to an elongated ridge, head portion 410d is generally tubular. Axisymmetric posts or elongated ridges 406d define a plurality of channels 412d having a generally rectilinear shape. In FIG. 5e, stem portion 408e and head portion 410e are hollow, and head portion 410e has a generally circular shape. This design may be applied, e.g., to an axisymmetric post or an elongated ridge. In other embodiments, at least a portion of stem portion 408e and/or at least a portion of head portion 410e may be hollow. Axisymmetric posts or elongated ridges 406e define a plurality of channels 412e having a generally rectilinear shape. In FIG. 5f, stem portion 408f and head portion 410f define a generally T-shaped ridge 406f. Generally T-shaped ridges 406f define a plurality of channels 412f having a generally rectilinear shape. In FIG. 5g, stem portion 408g and head portion 410g define a generally curvilinear ridge 406g. Generally curvilinear ridges 406g define a plurality of channels 412g having a generally curvilinear shape, such as, e.g., a U-shape. In other embodiments, generally curvilinear ridges 406g may define a plurality of channels 412g having a generally circular shape. In FIG. 5h, head portion 410h has a generally curvilinear shape and extends from stem portion 408h curving toward base sheet 404 exemplifying a generally sickle-shaped ridge. This design may be applied, e.g., to an elongated ridge. Elongated ridges 406h define a plurality of channels 412h having a generally rectilinear shape. In FIG. 5i, stem portion 408i and head portion 410i define a generally P-shaped ridge 406i. Head portion 410i has a generally curvilinear shape. This design may be applied, e.g., to an elongated ridge. Elongated ridges 406i define a plurality of channels 412i having a generally rectilinear shape. In FIG. 5j, head portion 410j has a generally curvilinear shape and extends from stem portion 408j curving toward base sheet 404. This design may be applied, e.g., to an axisymmetric post or an elongated ridge. Axisymmetric posts or elongated ridges 406j define a plurality of channels 412j having a generally rectilinear shape. Axisymmetric posts or elongated ridges 406j include a spring portion 434 positioned between head portion 410j and top surface 404a of base sheet 404. Spring portion 434 extends generally laterally from stem portion 408j and is configured to position at least one wire within channel 412j. Although in the embodiment of FIG. 5j, spring portion 434 has a generally curvilinear shape and extends from stem portion 408j curving toward base sheet 404, in other embodiments, spring portion 434 may have any other suitable shape to accommodate suitable positioning of at least one wire within a channel.

A wire management article according to an aspect of the present invention may be configured to be mounted to a support. A support may be any structure providing structural support to the wire management article connected thereto. Examples of supports include walls, floors, ceilings, support structures, pipes, table tops, cabinets, and control panels of electrical, pneumatic, or hydraulic systems, and wiring ducts. FIGS. 6a-6b, 7a-7b, and 8a-8b illustrate three exemplary methods of mounting a wire management article according to an aspect of the present invention to a support.

Figure 6A:
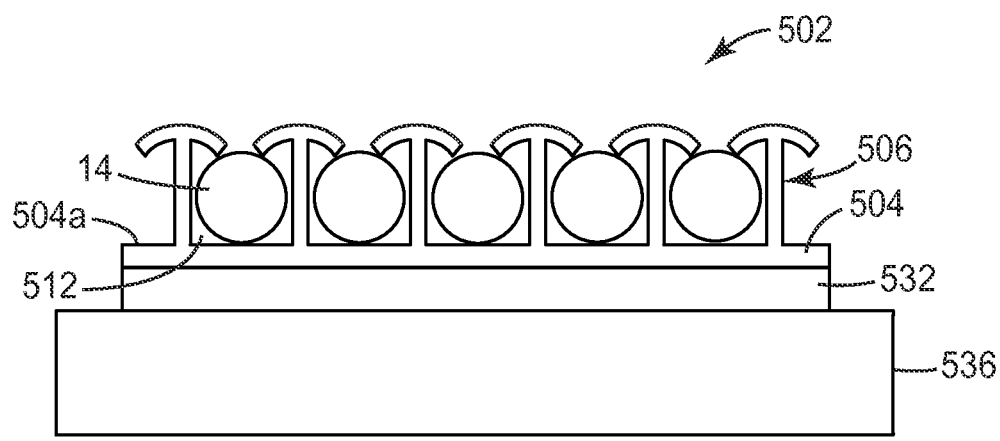
FIGS. 6*a*-6*b*, 7*a*-7*b*, and 8*a*-8*b* are schematic side and top views respectively of three exemplary methods of mounting a wire management article according to an aspect of the present invention.
Figure 6B:
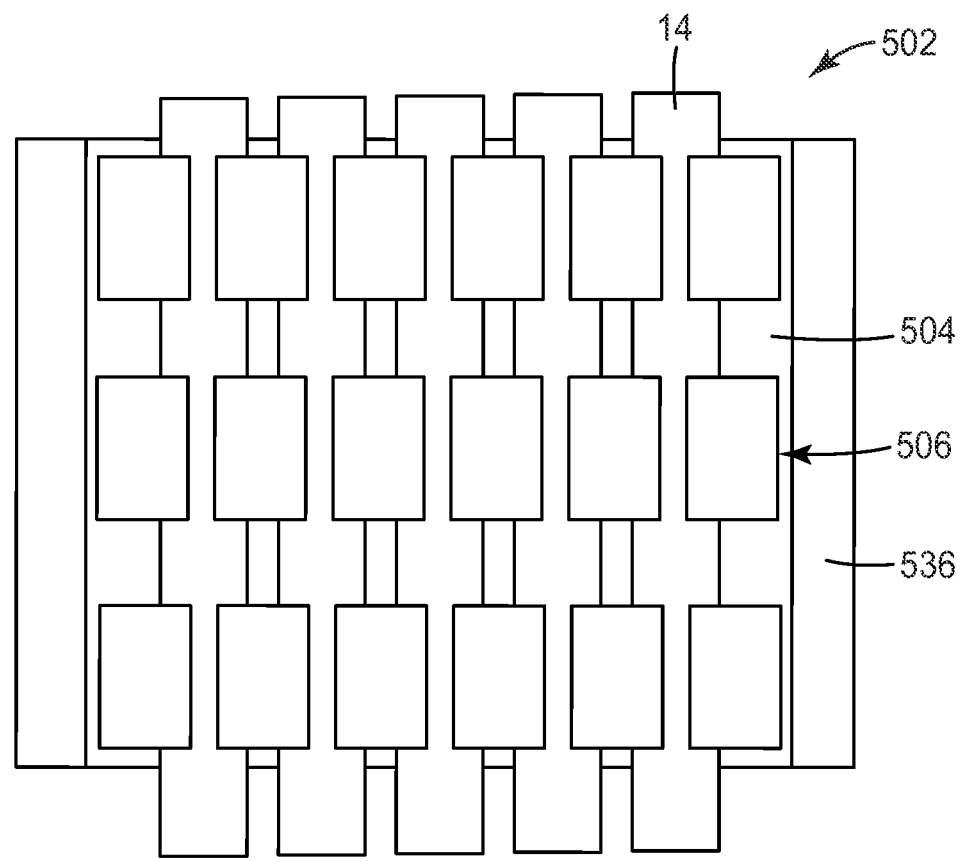

FIGS. 6a-6b illustrate a method that uses an adhesive layer 532 to mount a wire management article 502 to a support 536. Wire management article 502 includes a base sheet 504 and a plurality of wire management elements 506. Wire management elements 506 project from a top surface 504a of base sheet 504 and define a plurality of channels 512. Each channel 512 is configured to retain at least one wire 14. Adhesive layer 532 is disposed between base sheet 504 and support 536 mounting wire management article 502 to support 536.

Figure 7A:
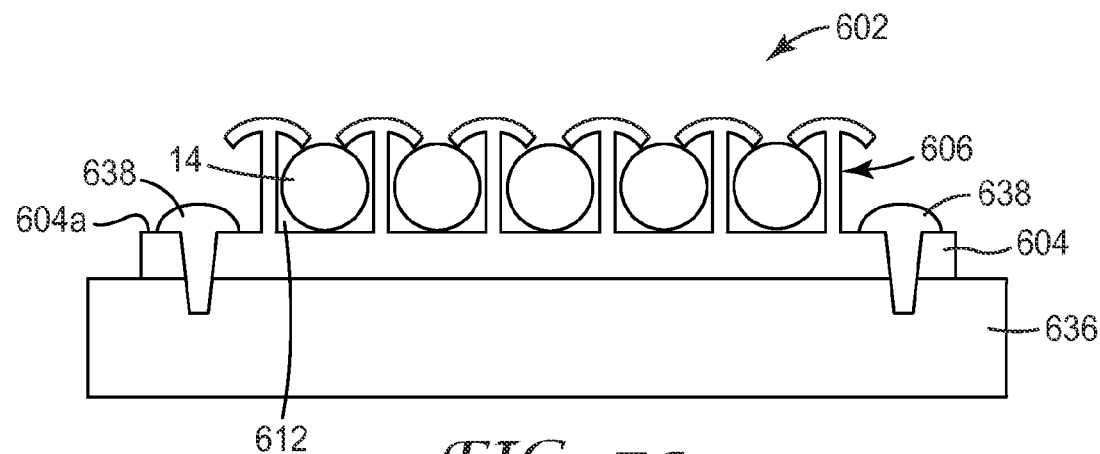
Figure 7B:
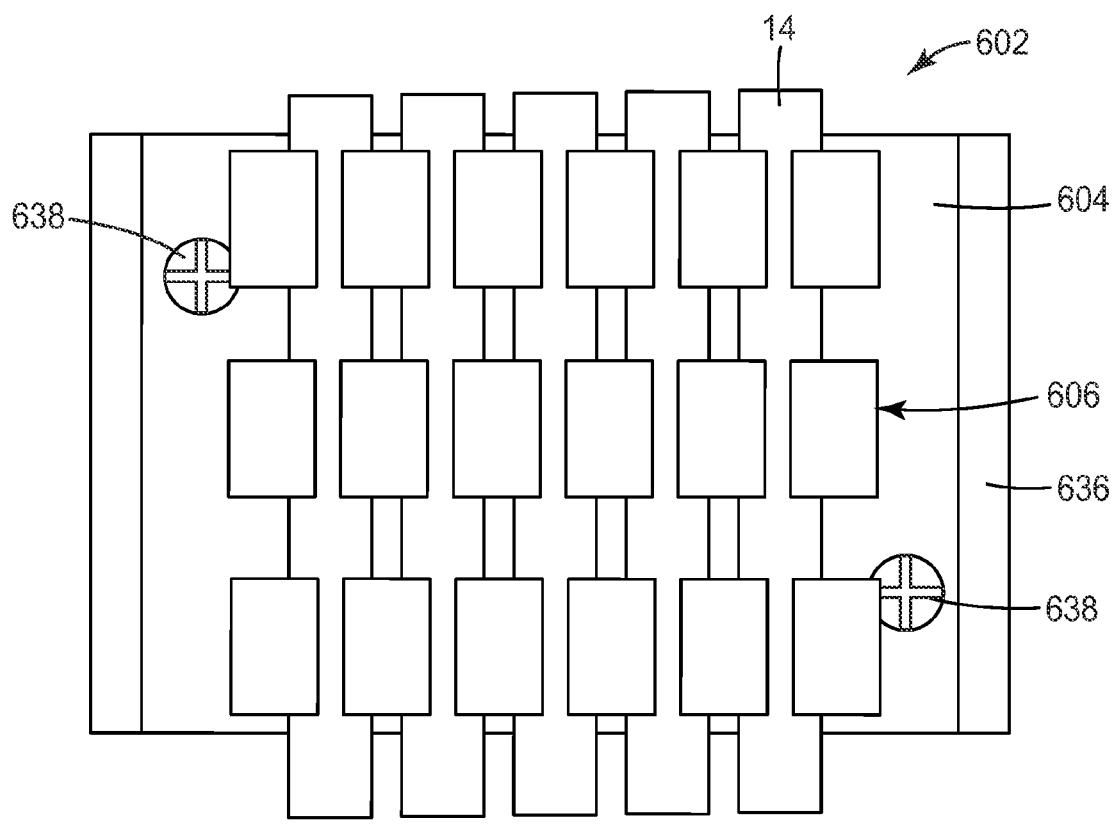
Figure 8A:
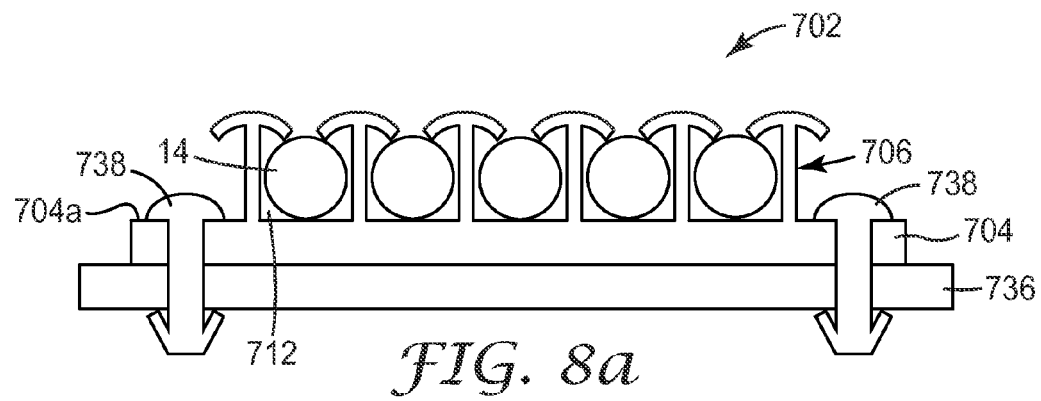
Figure 8B:
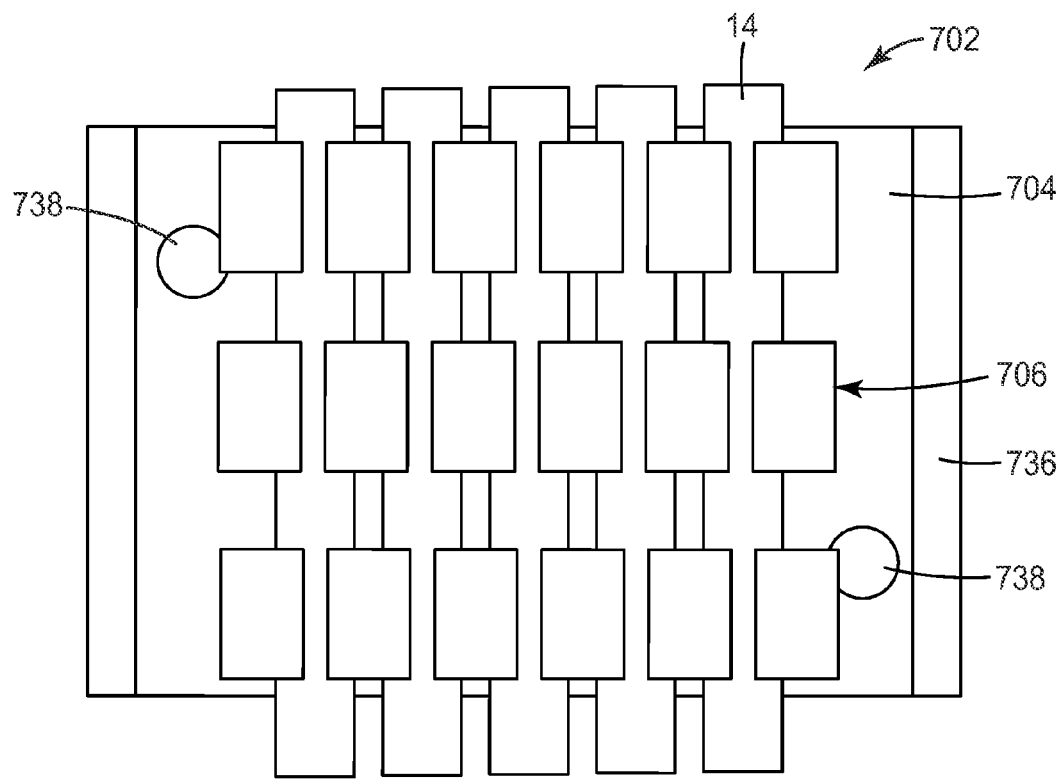

In place of or in addition to an adhesive layer, mechanical fasteners may be used to mount a wire management article to a support. Examples of suitable mechanical fasteners are screws, rivets, hose clamps, wire ties, and retention clips, to name a few. FIGS. 7a-7b illustrate a method that uses screws 638 to mount a wire management article 602 to a support 636. Wire management article 602 includes a base sheet 604 and a plurality of wire management elements 606. Wire management elements 606 project from a top surface 604a of base sheet 604 and define a plurality of channels 612. Each channel 612 is configured to retain at least one wire 14. Screws 638 mount wire management article 602 to support 636. FIGS. 8a-8b illustrate a method that uses retention clips 738 to mount a wire management article 702 to a support 736. Wire management article 702 includes a base sheet 704 and a plurality of wire management elements 706. Wire management elements 706 project from a top surface 704a of base sheet 704 and define a plurality of channels 712. Each channel 712 is configured to retain at least one wire 14. Retention clips 738 mount wire management article 702 to support 736.

Figure 9A:
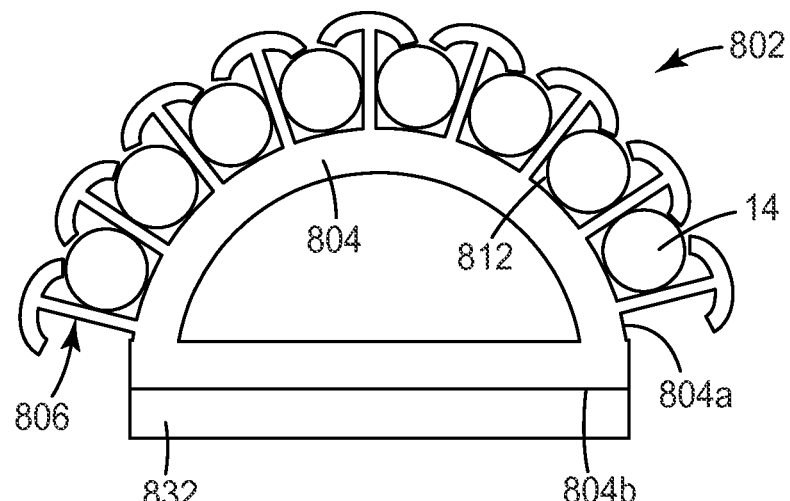
FIGS. 9*a*-9*c* are schematic side views of three exemplary embodiments of a wire management article according to an aspect of the present invention having a non-linear design.
Figure 9B:
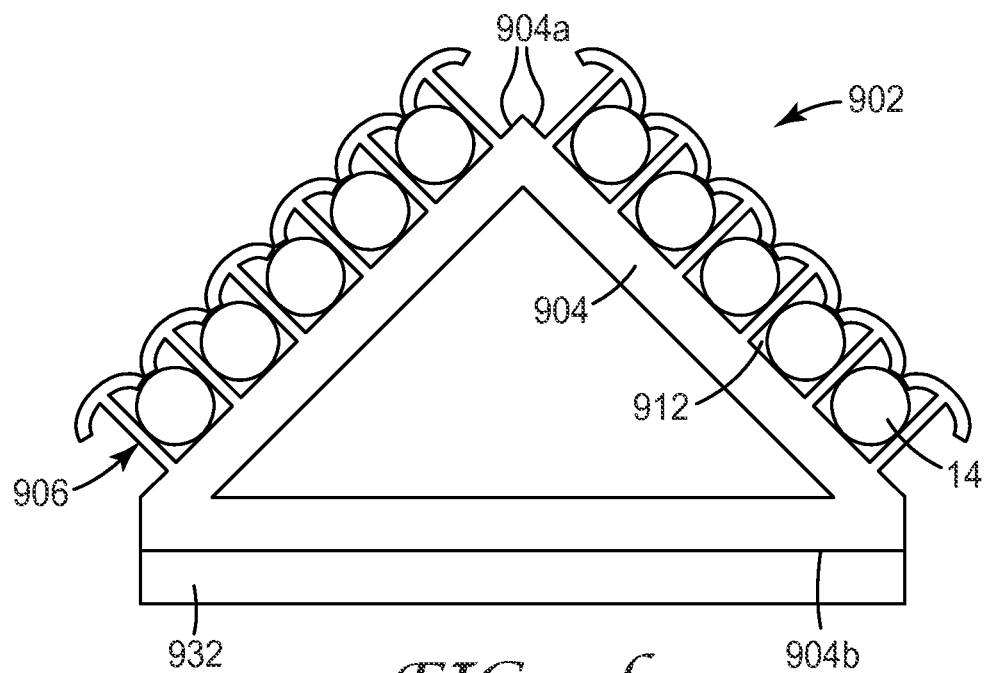
Figure 9C:
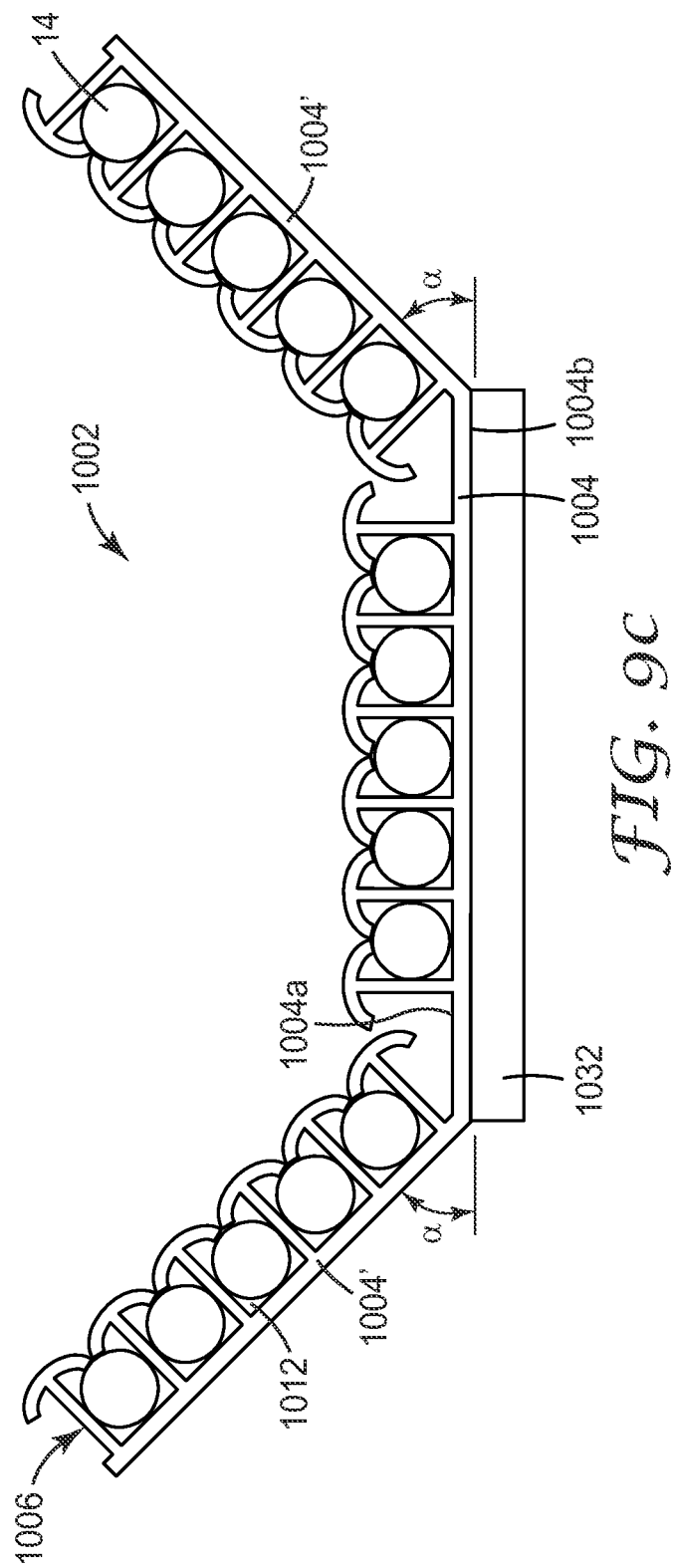

A wire management article according to an aspect of the present invention may have a non-linear design, examples of which are illustrated in FIGS. 9a-9c. Non-linear designs of a wire management article according to an aspect of the present invention include a non-linear or shaped base sheet. The base sheet has a major surface from which a plurality of wire elements project, and is shaped such as to define a mounting surface that is smaller than the major surface. Compared to a linear arrangement, such as, e.g., the arrangement illustrated in FIG. 6a, a nonlinear arrangement allows a larger number of channels to be defined within the same mounting surface area or "footprint", all other things being equal. This means that a larger number of wires can be retained in the same mounting surface area or "footprint".

In FIG. 9a, a wire management article 802 includes a generally D-shaped base sheet 804 and a plurality of wire management elements 806. Wire management elements 806 project from a major surface 804a of base sheet 804 and define a plurality of channels 812. Each channel 812 is configured to retain at least one wire 14. Base sheet 804 is shaped in a generally half-round tubular shape such as to define a mounting surface 804b that is smaller than major surface 804a. Wire management article 802 further includes an adhesive layer 832 attached to mounting surface 804b of base sheet 804. Adhesive layer 832 functions to attach wire management article 802 to a support (not shown).

In FIG. 9b, a wire management article 902 includes a generally triangularly shaped base sheet 904 and a plurality of wire management elements 906. Wire management elements 906 project from a major surface 904a of base sheet 904 and define a plurality of channels 912. Each channel 912 is configured to retain at least one wire 14. Base sheet 904 is shaped in a generally triangular tubular shape such as to define a mounting surface 904b that is smaller than major surface 904a. Wire management article 902 further includes an adhesive layer 932 attached to mounting surface 904b of base sheet 904. Adhesive layer 932 functions to attach wire management article 902 to a support (not shown).

In FIG. 9c, a wire management article 1002 includes a generally wing-shaped base sheet 1004 and a plurality of wire management elements 1006. Wire management elements 1006 project from a major surface 1004a of base sheet 1004 and define a plurality of channels 1012. Each channel 1012 is configured to retain at least one wire 14. Base sheet 1004 is shaped in a channel shape such as to define a mounting surface 1004b that is smaller than major surface 1004a. Portions 1004' of base sheet 1004 may be shaped at any angle α as is suitable for the intended application. For example, base sheet 1004 may be shaped in a U-shaped channel, whereby portions 1004' are shaped at an angle α of about 90°. In other embodiments, base sheet 1004 may have a single portion 1004'. For example, base sheet 1004 may be shaped in an L-shaped channel, whereby a single portion 1004' is shaped at an angle α of about 90°. Wire management article 1002 further includes an adhesive layer 1032 attached to mounting surface 1004b of base sheet 1004. Adhesive layer 1032 functions to attach wire management article 1002 to a support (not shown).

Wire management articles according to an aspect of the present invention may be designed to retain wires having different diameters. Specifically, the wire management articles may include wire management elements designed to define channels configured such that wires having different diameters can be retained. Further, wire management articles according to an aspect of the present invention may be designed to retain at least two wires in a stacked arrangement. Specifically, the wire management articles may include wire management elements designed to define channels configured such that wires can be retained in a stacked arrangement. Removal of a wire from a channel may require the removal of another wire from the same channel, but the stacked wire arrangement provides a more laterally compact collection of wires than a single wire arrangement. Exemplary embodiments of a wire management article wherein the channels are configured to retain wires having different diameters and wherein the channels are configured to retain at least two wires in a stacked arrangement are illustrated in FIGS. 10a-10d.

Figure 10A:
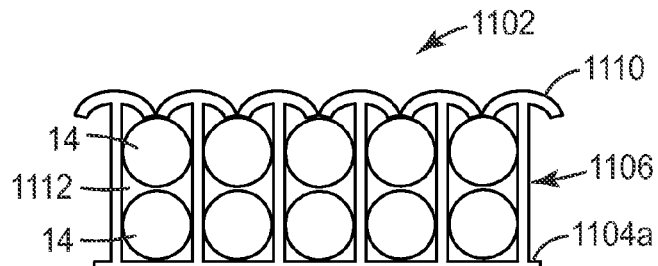
FIGS. 10*a*-10*d* are schematic side views of two exemplary embodiments of a wire management article according to an aspect of the present invention illustrating stacking of different diameter wires.
Figure 10B:
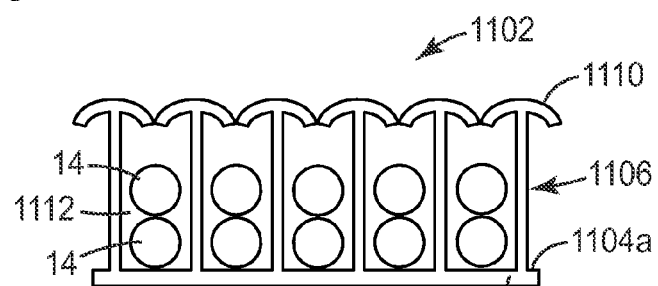

Referring to FIGS. 10a-10b, a wire management article 1102 includes a base sheet 1104 and a plurality of wire management elements 1106. Wire management elements 1106 may include elongated ridges or axisymmetric posts. Wire management elements 1106 project from a major surface 1104a of base sheet 1104 and define a plurality of channels 1112. Each channel 1112 is configured to retain at least two wires 14 in a stacked arrangement. In FIGS. 10a-10b, a stack of two wires 14 in each channel 1112 is shown. Channels 1112 are also configured to retain wires 14 having different diameters. Wires 14 in FIG. 10b have a smaller diameter than wires 14 in FIG. 10a. Whereas wires 14 in FIG. 10a substantially fill each channel 1112, wires 14 in FIG. 10b do not. Head portions 1110 of wire management elements 1106 are configured such that both wires 14 in FIG. 10a and wires 14 in FIG. 10b are retained in channels 1112.

Figure 10C:
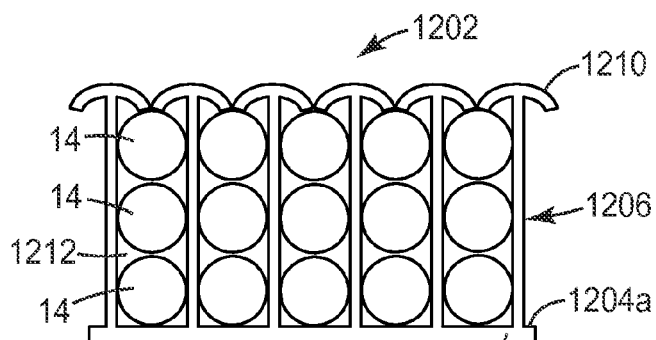
Figure 10D:
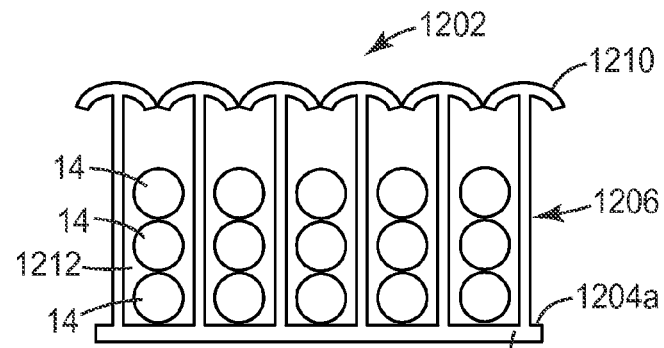

Referring to FIGS. 10c-10d, a wire management article 1202 includes a base sheet 1204 and a plurality of wire management elements 1206. Wire management elements 1206 may include elongated ridges or axisymmetric posts. Wire management elements 1206 project from a major surface 1204a of base sheet 1204 and define a plurality of channels 1212. Each channel 1212 is configured to retain at least two wires 14 in a stacked arrangement. In FIGS. 10c-10d, a stack of three wires 14 in each channel 1212 is shown. Channels 1212 are also configured to retain wires 14 having different diameters. Wires 14 in FIG. 10d have a smaller diameter than wires 14 in FIG. 10c. Whereas wires 14 in FIG. 10c substantially fill each channel 1212, wires 14 in FIG. 10d do not. Head portions 1210 of wire management elements 1206 are configured such that both wires 14 in FIG. 10c and wires 14 in FIG. 10d are retained in channels 1212.

FIGS. 11a-11e illustrate various exemplary embodiments of a wire management article according to an aspect of the present invention having a two-piece structure. In addition to a base sheet, a two-piece structure includes a cover sheet, or a "lid".

Figure 11A:
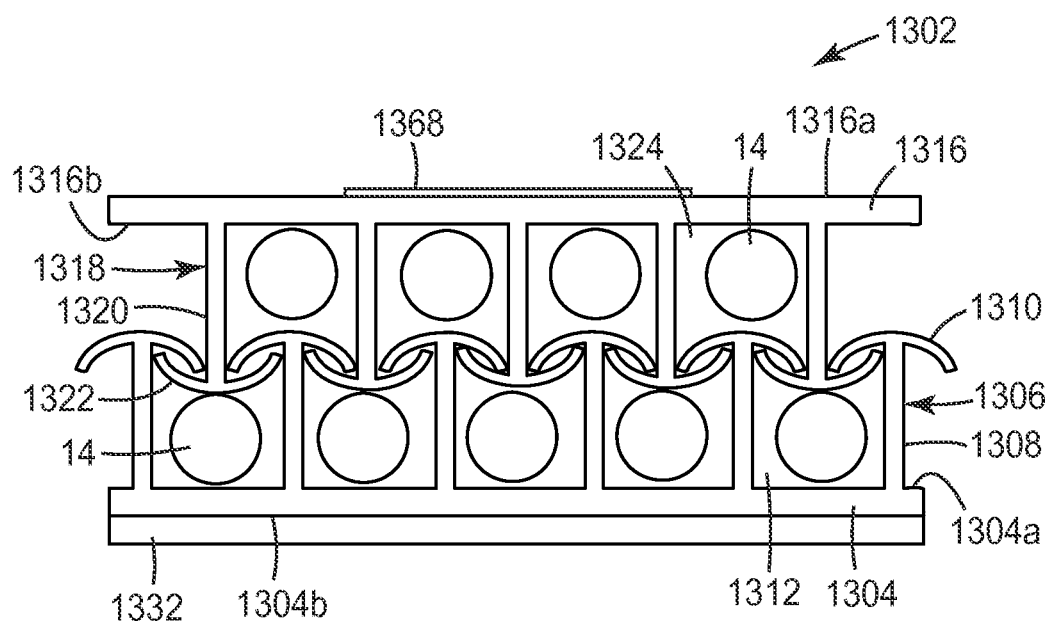
FIGS. 11*a*-11*e* are schematic side views of various exemplary embodiments of a wire management article according to an aspect of the present invention having a two-piece structure.

Referring to FIG. 11a, a wire management article 1302 includes a base sheet 1304 and a plurality of first wire management elements 1306. First wire management elements 1306 project from a top surface 1304a of base sheet 1304. Each first wire management element 1306 includes a first stem portion 1308 and a first head portion 1310. First stem portion 1308 is attached to and generally upright from base sheet 1304. First head portion 1310 is spaced from top surface 1304a of base sheet 1304 and extends generally laterally from first stem portion 1308. First wire management elements 1306 define a plurality of first channels 1312. Each first channel 1312 is configured to retain at least one wire 14. Wire management article 1302 further includes a cover sheet 1316 and a plurality of second wire management elements 1318. Second wire management elements 1318 project from a bottom surface 1316b of cover sheet 1316. Each second wire management element 1318 includes a second stem portion 1320 and a second head portion 1322. Second stem portion 1320 is attached to and generally upright from cover sheet 1316. Second head portion 1322 is spaced from bottom surface 1316b of cover sheet 1316 and extends generally laterally from second stem portion 1320. Second wire management elements 1318 define a plurality of second channels 1324. Each second channel 1324 is configured to retain at least one wire 14. Cover sheet 1316 is releasably attached to base sheet 1304 by interlocking first wire management elements 1306 and second wire management elements 1318. In this embodiment, first wire management elements 1306 assist in retaining wires 14 in second channels 1324, and second wire management elements 1318 assist in retaining wires 14 in first channels 1312. Wire management article 1302 further includes an adhesive layer 1332 attached to a bottom surface 1304b of base sheet 1304. Adhesive layer 1332 functions to attach wire management article 1302 to a support (not shown).

Figure 11B:
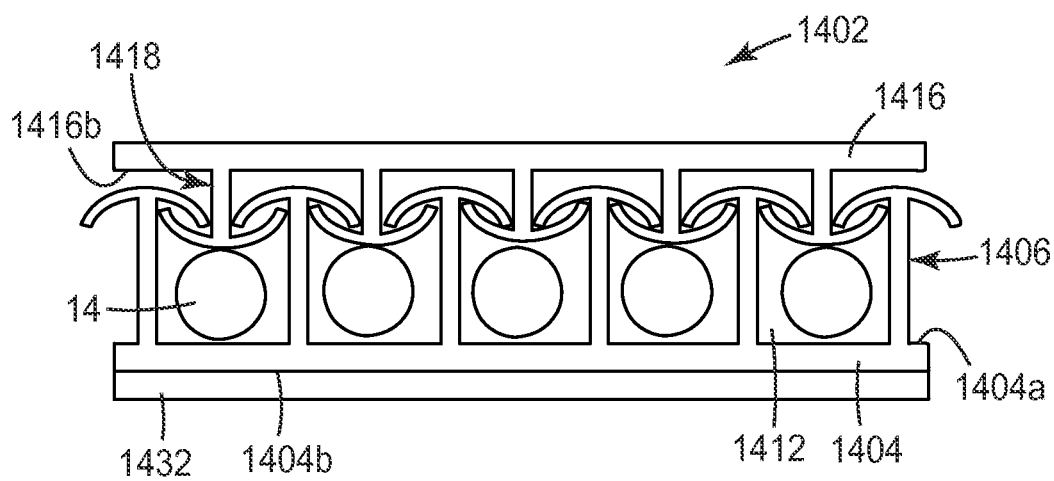

In FIG. 11b, a wire management article 1402 includes a base sheet 1404 and a plurality of first wire management elements 1406. First wire management elements 1406 project from a top surface 1404a of base sheet 1404 and define a plurality of first channels 1412. Each first channel 1412 is configured to retain at least one wire 14. Wire management article 1402 further includes a cover sheet 1416 and a plurality of second wire management elements 1418. Second wire management elements 1418 project from a bottom surface 1416b of cover sheet 1416. Cover sheet 1416 is releasably attached to base sheet 1404 by interlocking first wire management elements 1406 and second wire management elements 1418. In this embodiment, second wire management elements 1418 do not define a plurality of channels configured to retain wires, but assist in retaining wires 14 in first channels 1412. Wire management article 1402 further includes an adhesive layer 1432 attached to a bottom surface 1404*b* of base sheet 1404. Adhesive layer 1432 functions to attach wire management article 1402 to a support (not shown).

Figure 11C:
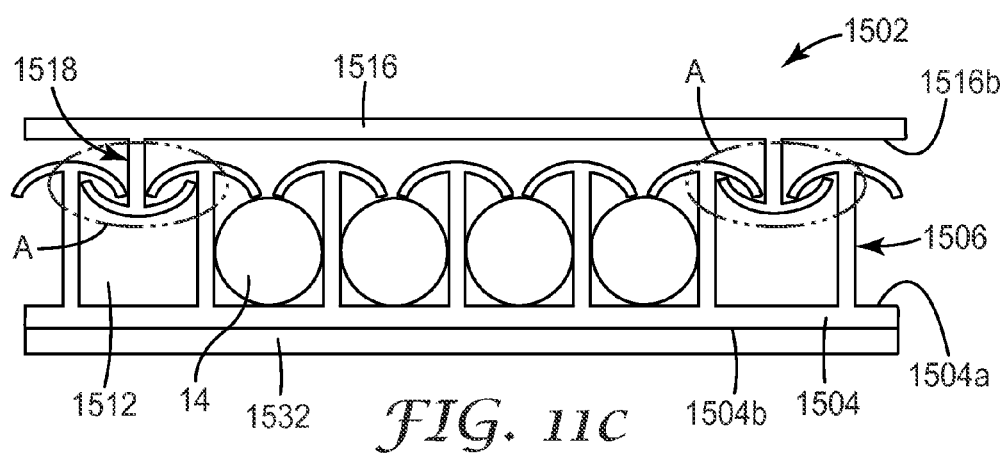

FIG. 11*c* illustrates another exemplary embodiment of a wire management article according to an aspect of the present invention. Wire management article 1502 includes a base sheet 1504 and a plurality of first wire management elements 1506. First wire management elements 1506 project from a top surface 1504*a* of base sheet 1504 and define a plurality of first channels 1512. Each first channel 1512 is configured to retain at least one wire 14. Wire management article 1502 further includes a cover sheet 1516 and a plurality of second wire management elements 1518. Second wire management elements 1518 project from a bottom surface 1516*b* of cover sheet 1516. Cover sheet 1516 is releasably attached to base sheet 1504 by interlocking first wire management elements 1506 and second wire management elements 1518. In this embodiment, second wire management elements 1518 do not define a plurality of channels configured to retain wires and do not assist in retaining wires 14 in first channels 1512, but merely cooperate with corresponding first wire management elements 1506 to releasably attach cover sheet 1516 to base sheet 1504, as shown in areas A of FIG. 11*c*. Wire management article 1502 further includes an adhesive layer 1532 attached to a bottom surface 1504*b* of base sheet 1504. Adhesive layer 1532 functions to attach wire management article 1502 to a support (not shown).

Figure 11D:
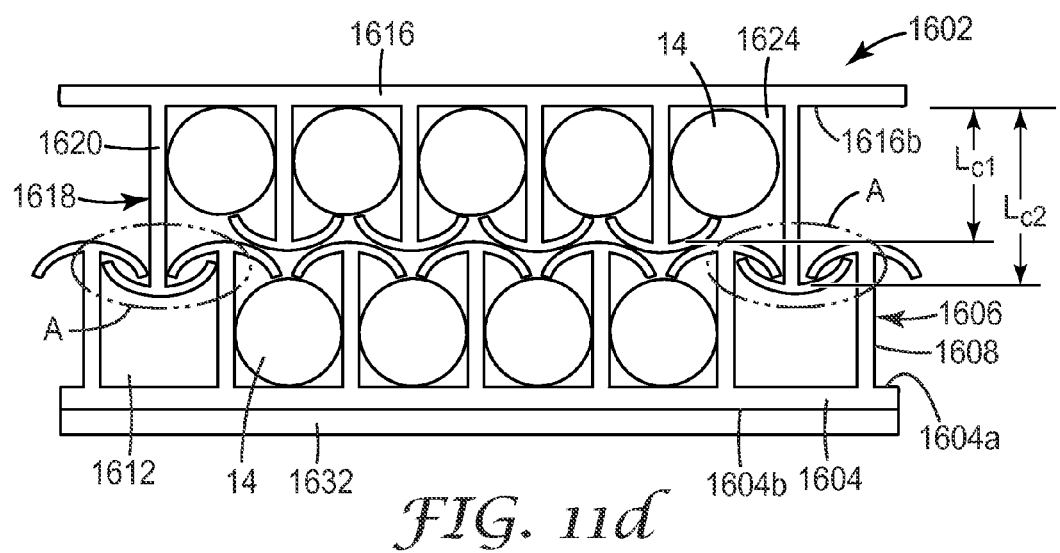

Referring to FIG. 11*d*, wire management article 1602 includes a base sheet 1604 and a plurality of first wire management elements 1606. First wire management elements 1606 project from a top surface 1604*a* of base sheet 1604 and define a plurality of first channels 1612. Each first channel 1612 is configured to retain at least one wire 14. Wire management article 1602 further includes a cover sheet 1616 and a plurality of second wire management elements 1618. Second wire management elements 1618 project from a bottom surface 1616*b* of cover sheet 1616 and define a plurality of second channels 1624. Each second channel 1624 is configured to retain at least one wire 14. Cover sheet 1616 is releasably attached to base sheet 1604 by interlocking only some of first wire management elements 1606 and second wire management elements 1618, as shown in areas A of FIG. 11*d*. In this embodiment, second stem portions 1620 of those second wire management elements 1618 that interlock with corresponding first wire management elements 1606 have a length $L_{c2}$ greater than a length $L_{c1}$ of second stem portions 1620 of those second wire management elements 1618 that do not interlock. In other embodiments, one or both of first stem portions 1608 and second stem portions 1620 may have at least two different lengths, e.g., to enable interlocking or not interlocking of first wire management elements 1606 and second wire management elements 1618. Wire management article 1602 further includes an adhesive layer 1632 attached to a bottom surface 1604*b* of base sheet 1604. Adhesive layer 1632 functions to attach wire management article 1602 to a support (not shown).

Figure 11E:
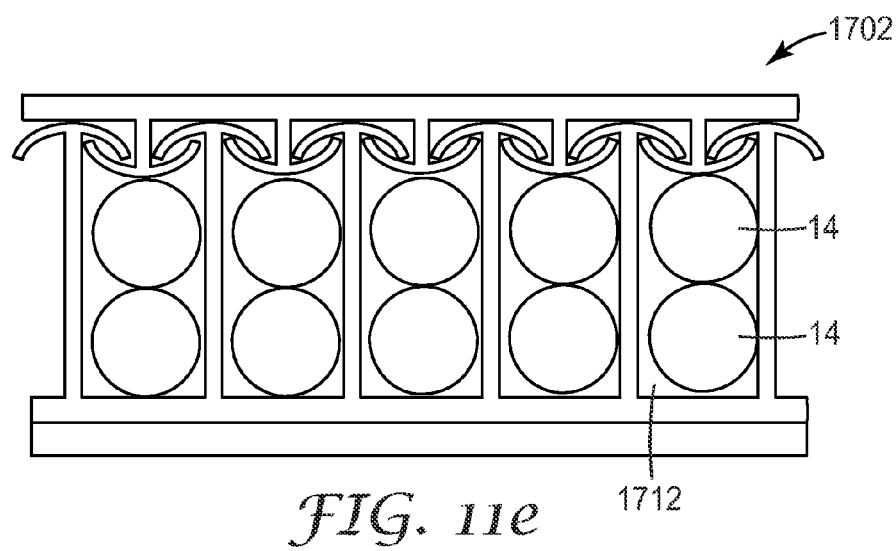

FIG. 11*e* illustrates another exemplary embodiment of a wire management article according to an aspect of the present invention. Wire management article 1702 illustrated in FIG. 11*e* is similar to wire management article 1402 illustrated in FIG. 11*b*. Whereas wire management article 1402 is illustrated retaining a single wire 14 in each channel 1412, wire management article 1702 is illustrated retaining two wires in a stacked arrangement in each channel 1712.

FIGS. 12*a*-12*h* illustrate various exemplary embodiments of a wire management article according to an aspect of the present invention having a bi-fold structure. A bi-fold structure includes a hinge portion connecting a cover sheet to a base sheet at a first end of the cover sheet. This connection may be complemented by a releasable connection at a second end of the cover sheet opposite the first end.

Figure 12A:
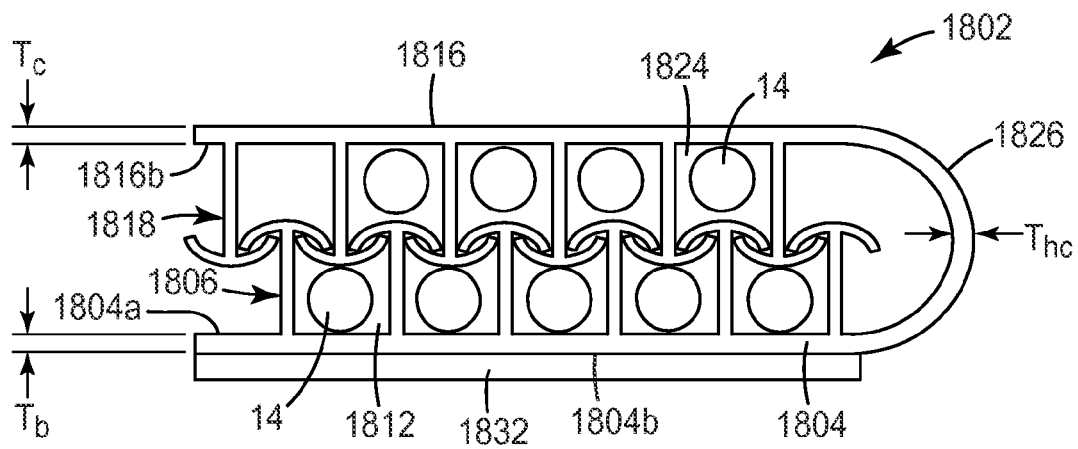
FIGS. 12*a*-12*h* are schematic side views of various exemplary embodiments of a wire management article according to an aspect of the present invention having a bi-fold structure.

Referring to FIG. 12*a*, wire management article 1802 includes a base sheet 1804 and a plurality of first wire management elements 1806. First wire management elements 1806 project from a top surface 1804*a* of base sheet 1804 and define a plurality of first channels 1812. Each first channel 1812 is configured to retain at least one wire 14. Wire management article 1802 further includes a cover sheet 1816 and a plurality of second wire management elements 1818. Second wire management elements 1818 project from a bottom surface 1816*b* of cover sheet 1816 and define a plurality of second channels 1824. Each second channel 1824 is configured to retain at least one wire 14. Cover sheet 1816 is releasably attached to base sheet 1804 by interlocking first wire management elements 1806 and second wire management elements 1818. In this embodiment, first wire management elements 1806 assist in retaining wires 14 in second channels 1824, and second wire management elements 1818 assist in retaining wires 14 in first channels 1812. Cover sheet 1816 is integrally formed with base sheet 1804 and includes an integrally formed cover sheet hinge portion 1826 connecting cover sheet 1816 to base sheet 1804. In other embodiments, hinge portion 1826 may be separately formed and assembled to base sheet 1804 and cover sheet 1816 using any suitable method/structure, including but not limited to snap fit, mechanical clamping, and adhesive. As shown in FIG. 12*a*, hinge portion 1826 is positioned at one end of wire management article and provides a permanent attachment of cover sheet 1816 to base sheet 1804. Hinge portion 1826 may have a thickness $T_{hc}$, substantially the same as or smaller than one or both of a thickness $T_c$ of cover sheet 1816 and a thickness $T_b$ of base sheet 1804. In this embodiment, hinge portion 1816 has a thickness $T_{hc}$ substantially the same as both thickness $T_c$ of cover sheet 1816 and thickness $T_b$ of base sheet 1804. A relatively smaller thickness $T_{hc}$ of hinge portion 1826 increases its relative flexibility. Wire management article 1802 further includes an adhesive layer 1832 attached to a bottom surface 1804*b* of base sheet 1804. Adhesive layer 1832 functions to attach wire management article 1802 to a support (not shown).

Figure 12B:
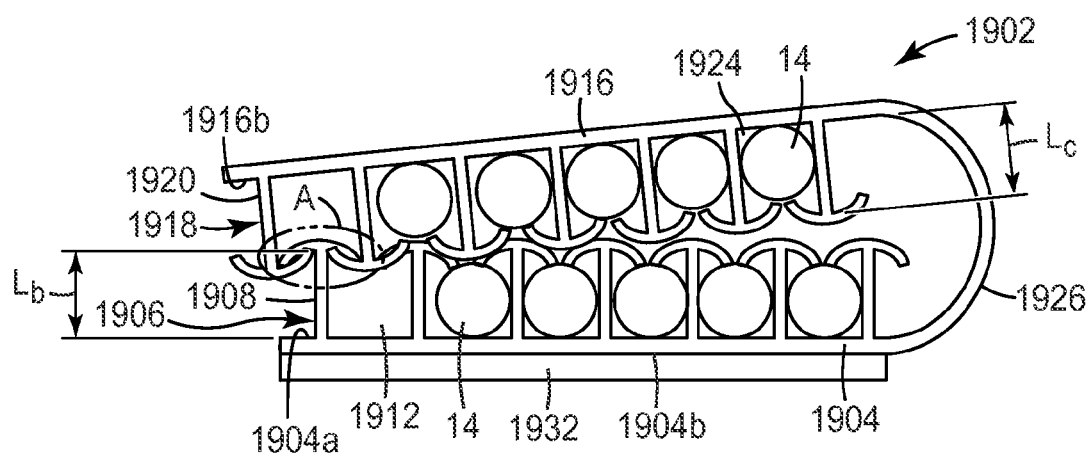

In FIG. 12*b*, wire management article 1902 includes a base sheet 1904 and a plurality of first wire management elements 1906. First wire management elements 1906 project from a top surface 1904*a* of base sheet 1904 and define a plurality of first channels 1912. Each first channel 1912 is configured to retain at least one wire 14. Wire management article 1902 further includes a cover sheet 1916 and a plurality of second wire management elements 1918. Second wire management elements 1918 project from a bottom surface 1916*b* of cover sheet 1916 and define a plurality of second channels 1924. Each second channel 1924 is configured to retain at least one wire 14. Cover sheet 1916 is releasably attached to base sheet 1904 by interlocking only some of first wire management elements 1906 and second wire management elements 1918, as shown in area A of FIG. 12*b*. Alternatively, instead of interlocking some of first wire management elements 1906 and second wire management elements 1918 to releasably attach cover sheet 1916 to base sheet 1904, any suitable latch mechanism known in the art may be used. In this embodiment, first stem portions 1908 of all first wire management elements 1906 have substantially the same length $L_b$, and second stem portions 1920 of all second wire management elements 1918 have substantially the same length $L_c$. Consequently, cover sheet 1916 is not parallel to base sheet 1904 when it is releasably attached to base sheet 1904, i.e., when wire management article 1902 is in a closed condition. Cover sheet 1916 is integrally formed with base sheet 1904 and includes a cover sheet hinge portion 1926 connecting cover sheet 1916 to base sheet 1904. Wire management article 1902 further includes an adhesive layer 1932 attached to a bottom surface 1904b of base sheet 1904. Adhesive layer 1932 functions to attach wire management article 1902 to a support (not shown).

Figure 12C:
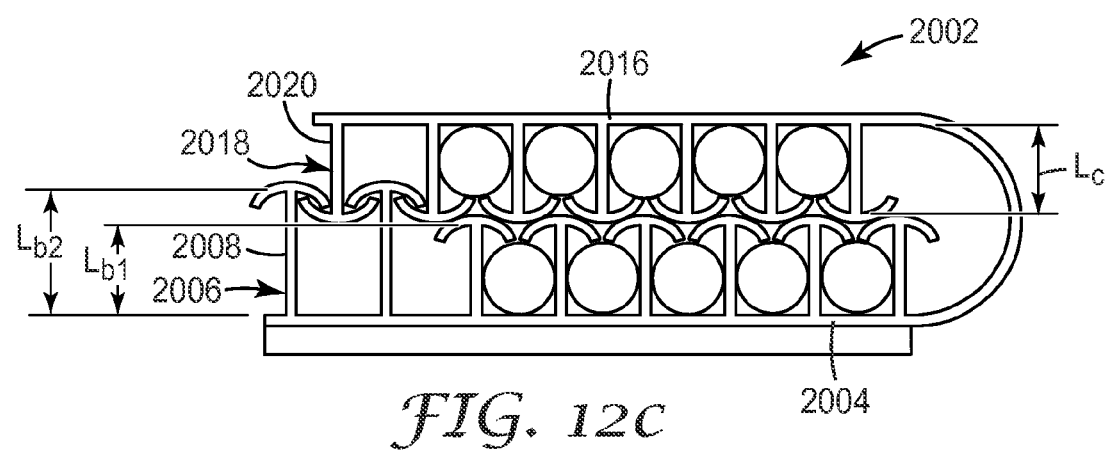

FIG. 12c illustrates another exemplary embodiment of a wire management article according to an aspect of the present invention. Wire management article 2002 illustrated in FIG. 12c is similar to wire management article 1902 illustrated in FIG. 12b. Whereas in wire management article 1902 first stem portions 1908 of all first wire management elements 1906 have substantially the same length $L_b$, in wire management article 2002, first stem portions 2008 of those first wire management elements 2006 that interlock with corresponding second wire management elements 2018 have a length $L_{b2}$ greater than a length $L_{b1}$ of first stem portions 2008 of those first wire management elements 2006 that do not interlock. Consequently, cover sheet 2016 is substantially parallel to base sheet 2004 when it is releasably attached to base sheet 2004, i.e., when wire management article 2002 is in a closed condition.

Figure 12D:
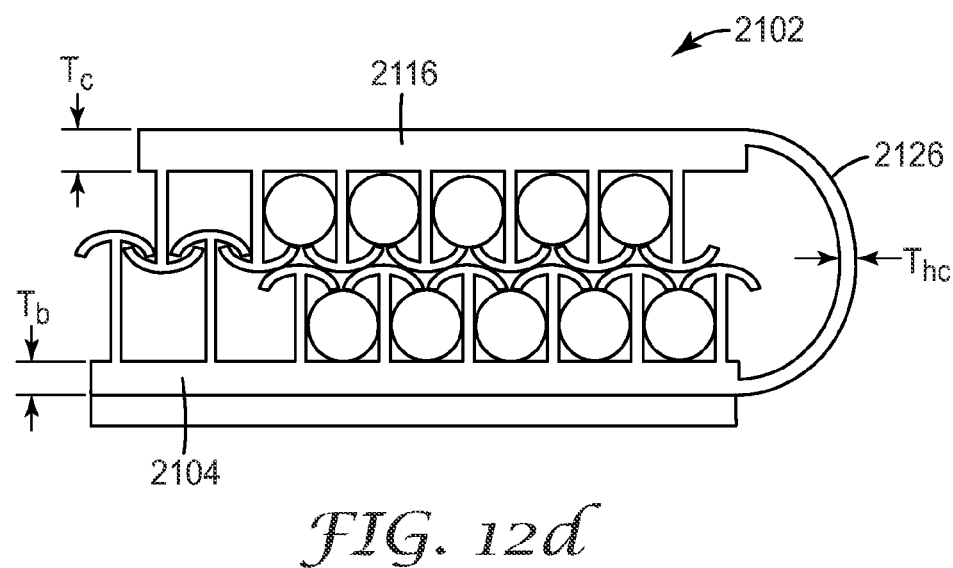

FIG. 12d illustrates another exemplary embodiment of a wire management article according to an aspect of the present invention. Wire management article 2102 illustrated in FIG. 12d is different from wire management article 2002 illustrated in FIG. 12c in that hinge portion 2126 has a thickness $T_{hc}$ smaller than both thickness $T_c$ of cover sheet 2116 and thickness $T_b$ of base sheet 2104. A relatively smaller thickness $T_{hc}$ of hinge portion 2126 increases its relative flexibility.

Figure 12E:
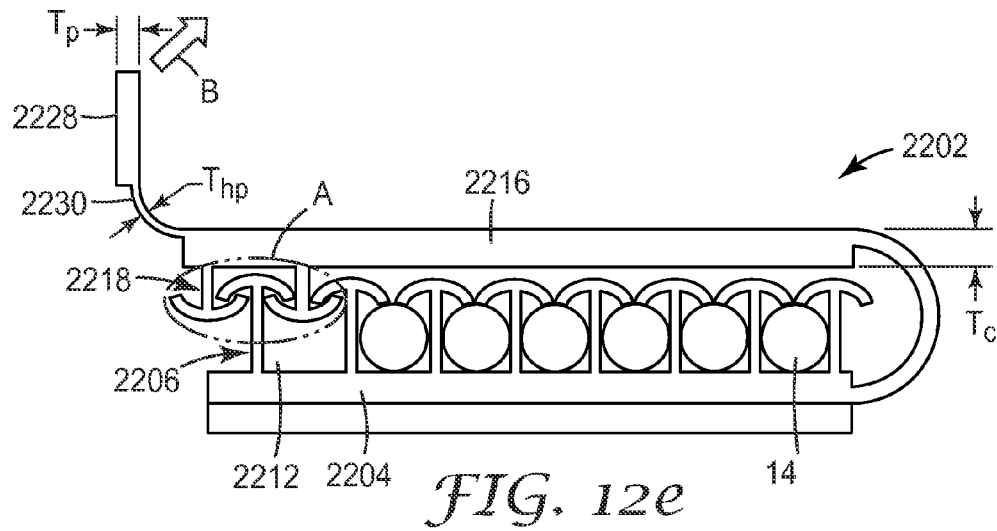

FIG. 12e illustrates another exemplary embodiment of a wire management article according to an aspect of the present invention. Wire management article 2202 includes a base sheet 2204 and a plurality of first wire management elements 2206. First wire management elements 2206 define a plurality of channels 2212. Each channel 2212 is configured to retain at least one wire 14. Wire management article 2202 further includes a cover sheet 2216 and a plurality of second wire management elements 2218. Cover sheet 2216 is releasably attached to base sheet 2204 by interlocking first wire management elements 2206 and corresponding second wire management elements 2218, as shown in area A of FIG. 12e. Wire management article 2202 further includes a pull tab 2228. Pull tab 2228 is integrally formed with cover sheet 2216 and includes a hinge portion 2230 connecting pull tab 2228 to cover sheet 2216. In other embodiments, pull tab 2228 may be separately formed and assembled to cover sheet 2216 using any suitable method/structure, including but not limited to snap fit, mechanical clamping, and adhesive. Hinge portion 2230 may have a thickness $T_{hp}$ substantially the same as or smaller than one or both of a thickness $T_p$ of pull tab 2228 and a thickness $T_c$ of cover sheet 2216. In this embodiment, hinge portion 2230 has a thickness $T_{hp}$ smaller than both thickness $T_p$ of pull tab 2228 and thickness $T_c$ of cover sheet 2216. A relatively smaller thickness $T_{hp}$ of hinge portion 2230 increases its relative flexibility. By pulling on pull tab 2228, as indicated by arrow B in FIG. 12e, second wire management elements 2218 unlock from corresponding first wire management elements 2206 and cover sheet 2216 is removed from base sheet 2204 such that channels 2212 can be easily accessed to add or remove wires 14.

Figure 12F:
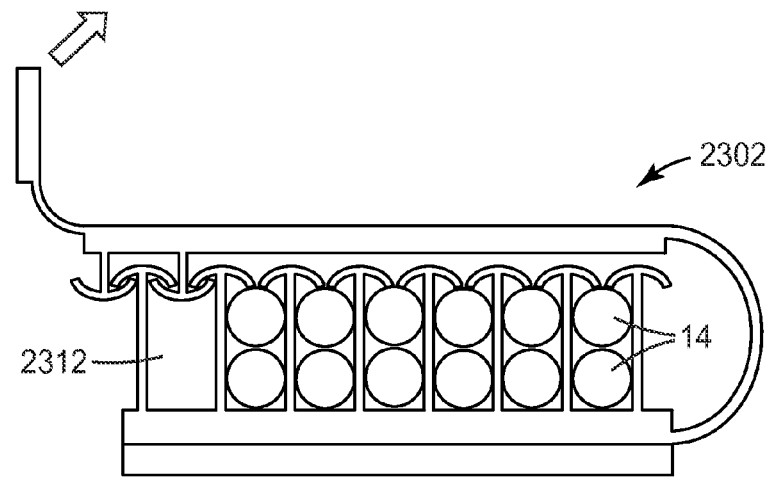

Wire management article 2302 illustrated in FIG. 12f is similar to wire management article 2202 illustrated in FIG. 12e. Whereas each channel 2212 of wire management article 2202 is configured to retain at least one wire 14, each channel 2312 of wire management article 2302 is configured to retain at least two wires 14 in a stacked arrangement.

Figure 12G:
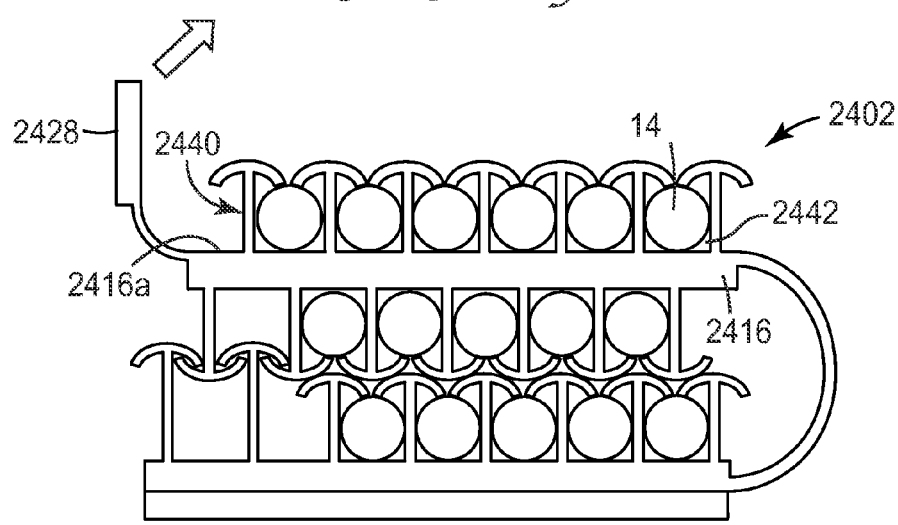

FIG. 12g illustrates another exemplary embodiment of a wire management article according to an aspect of the present invention. Wire management article 2402 illustrated in FIG. 12g is similar to wire management article 2102 illustrated in FIG. 12d. In wire management article 2402, a pull tab 2428 is integrally formed with cover sheet 2416, and cover sheet 2416 includes a plurality of additional wire management elements 2440. Additional wire management elements 2440 project from a top surface 2416a of cover sheet 2416 and define a plurality of additional channels 2442. Each additional channel 2442 is configured to retain at least one wire 14. Even when cover sheet 2416 is releasably attached to base sheet 2404, additional channels 2442 can be easily accessed to add or remove wires 14.

Figure 12H:
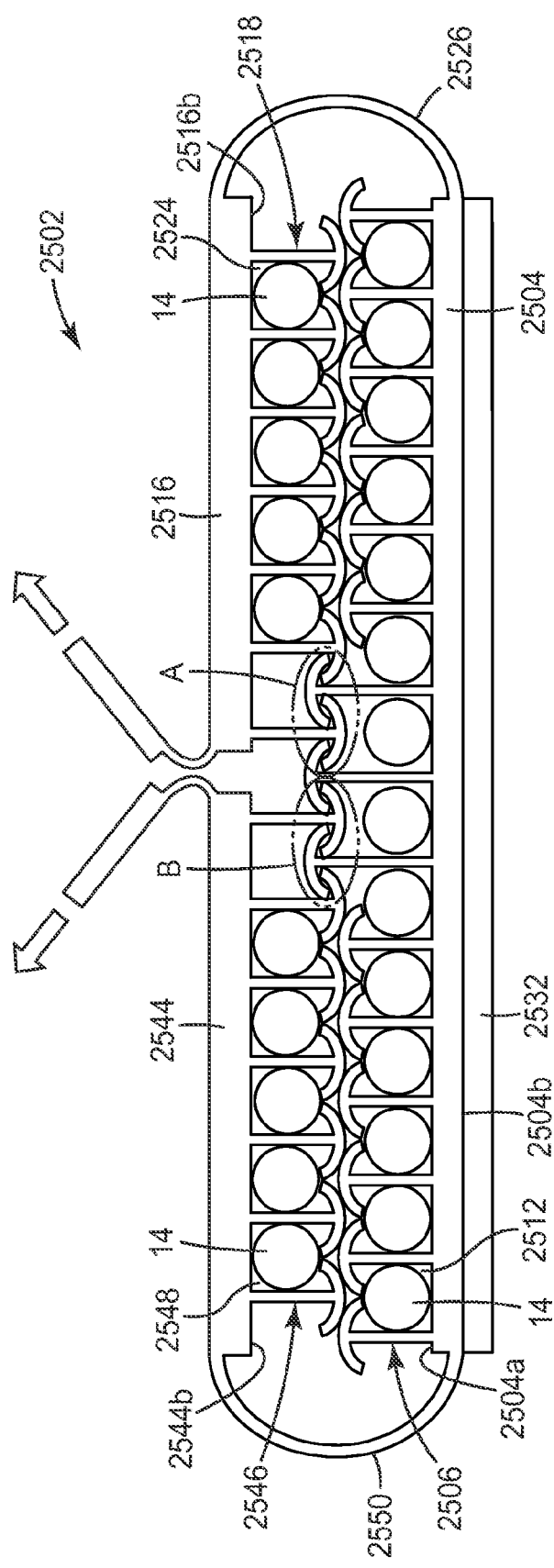

FIG. 12h illustrates another exemplary embodiment of a wire management article according to an aspect of the present invention. Wire management article 2502 includes a base sheet 2504 and a plurality of first wire management elements 2506. First wire management elements 2506 project from a top surface 2504a of base sheet 2504 and define a plurality of first channels 2512. Each first channel 2512 is configured to retain at least one wire 14. Wire management article 2502 further includes a first cover sheet 2516 and a plurality of second wire management elements 2518. Second wire management elements 2518 project from a bottom surface 2516b of first cover sheet 2516 and define a plurality of second channels 2524. Each second channel 2524 is configured to retain at least one wire 14. First cover sheet 2516 is releasably attached to base sheet 2504 by interlocking only some of first wire management elements 2506 and second wire management elements 2518, as shown in area A of FIG. 12h. First cover sheet 2516 is integrally formed with base sheet 2504 and includes a first cover sheet hinge portion 2526 connecting first cover sheet 2516 to base sheet 2504. Wire management article 2502 further includes a second cover sheet 2544 and a plurality of third wire management elements 2546. Third wire management elements 2546 project from a bottom surface 2544b of second cover sheet 2544 and define a plurality of third channels 2548. Each third channel 2548 is configured to retain at least one wire 14. Second cover sheet 2544 is releasably attached to base sheet 2504 opposite from first cover sheet 2516 by interlocking only some of first wire management elements 2506 and third wire management elements 2546, as shown in area B of FIG. 12h. Second cover sheet 2544 is integrally formed with base sheet 2504 and includes a second cover sheet hinge portion 2550 connecting second cover sheet 2544 to base sheet 2504. Wire management article 2502 further includes an adhesive layer 2532 attached to a bottom surface 2504b of base sheet 2504. Adhesive layer 2532 functions to attach wire management article 2502 to a support (not shown).

Now referring to FIGS. 13a-13b and 14a-14b, a wire management article according to an aspect of the present invention may be configured to retain wires in a generally non-parallel stacked arrangement, e.g., to electromagnetically isolate two or more individual wires or groups of wires from each other. Retaining wires in a generally non-parallel stacked arrangement reduces crosstalk between wires relative to retaining wires in a generally parallel stacked arrangement. A specific example includes retaining wires in a generally perpendicular stacked arrangement, e.g., to mitigate transverse electromagnetic mode (TEM) influences from power transmitting wires. Another way to electromagnetically isolate two or more individual wires or groups of wires from each other is to place a ground plane (not shown), such as, e.g., a metal shield, between the two or more individual wires or groups of wires. This ground plane may be housed in the wire management article or may be inserted between the two halves of a bi-fold wire management article, such as, e.g., wire management article 2002 shown in FIG. 12c, and may be electrically grounded to the support to which the wire management article is mounted, e.g., by connecting the ground plane to a mechanical fastener, such as, e.g., a screw, mounting the wire management article to the support.

Figure 13A:
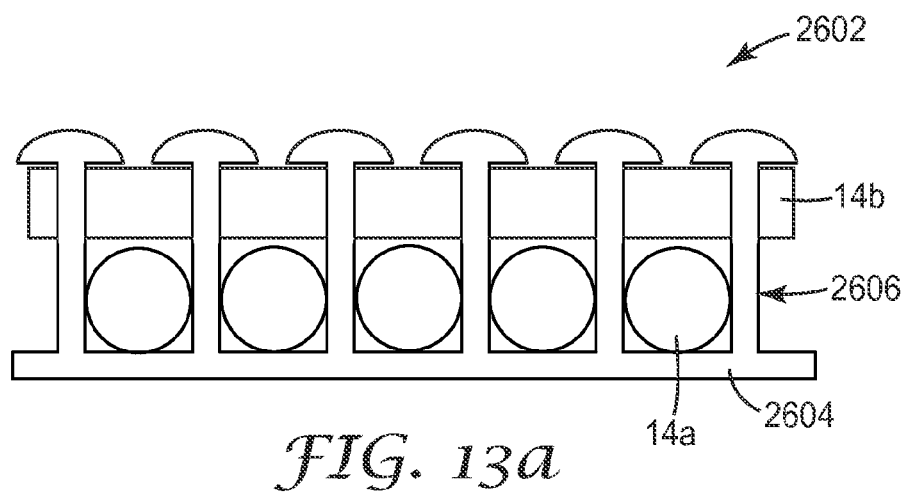
FIGS. 13*a*-13*b* and 14*a*-14*b* are schematic side and top views respectively of two exemplary embodiments of a wire management article according to an aspect of the present invention electrically isolating two sets of wires.
Figure 13B:
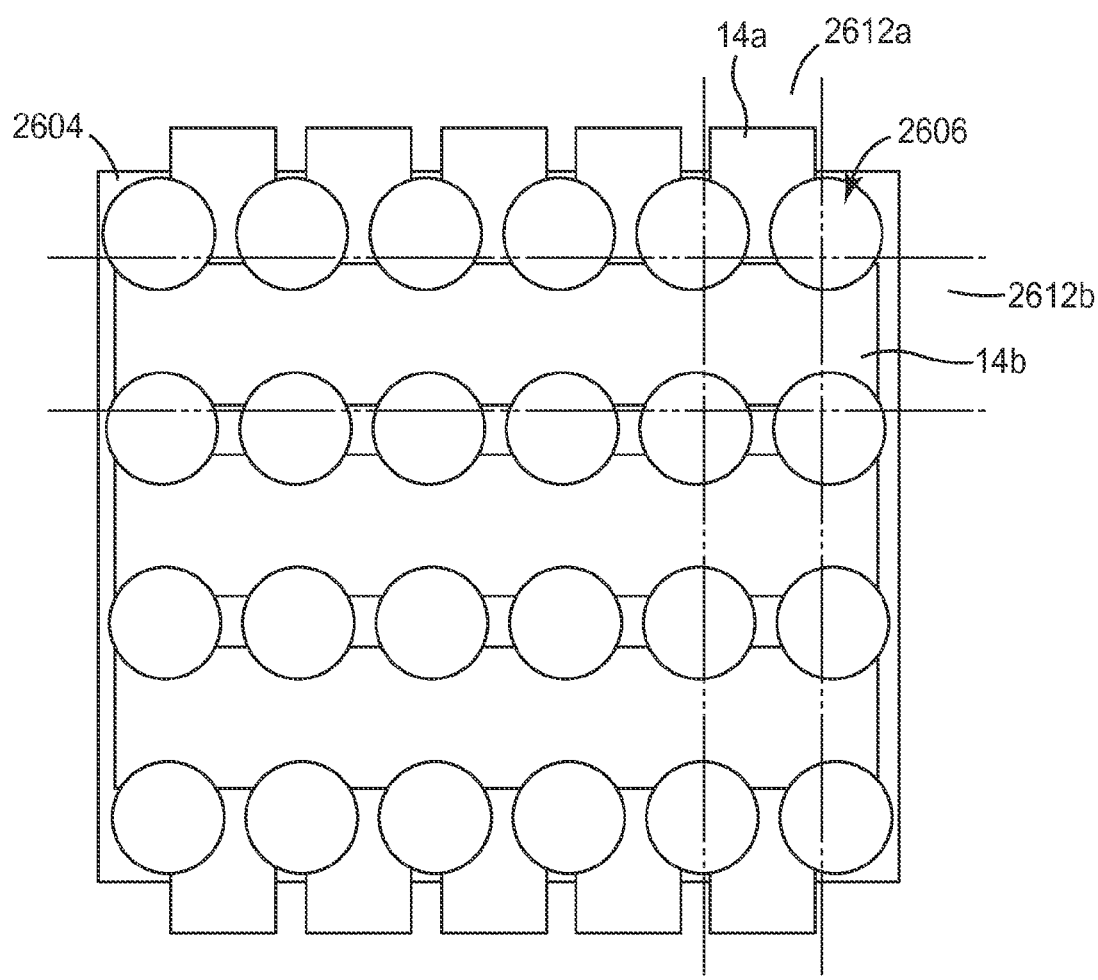
Figure 14A:
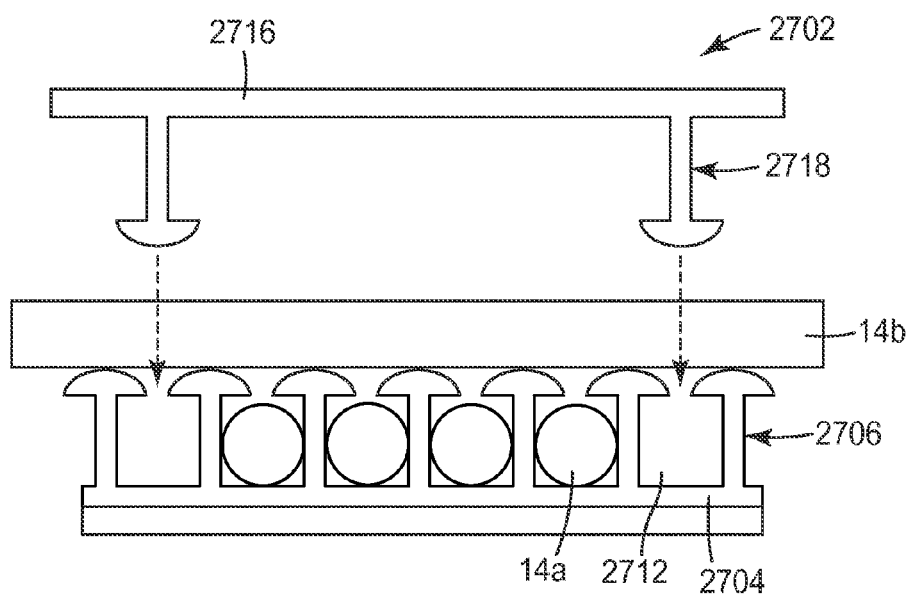
Figure 14B:
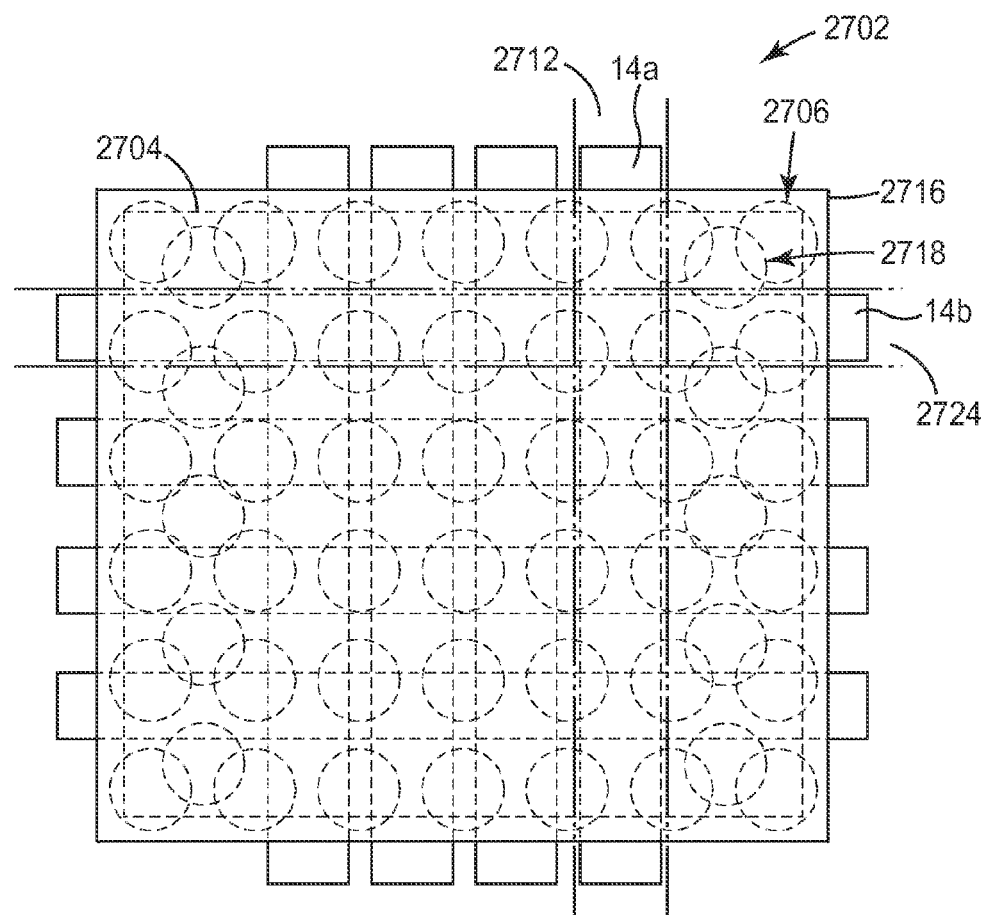

A non-parallel stacked arrangement of wires can be obtained with a one-piece construction, such as, e.g., the wire management article shown in FIGS. 13a-13b, or with a multi-piece construction, such as, e.g., a two-piece construction, such as, e.g., the wire management article shown in FIGS. 14a-14b.

Referring to FIGS. 13a-13b, a wire management article 2602 includes a base sheet 2604 and a plurality of posts 2606 projecting from base sheet 2604. Posts 2606 define a plurality of first channels 2612a and a plurality of second channels 2612b, as best shown in FIG. 13b. Each first channel 2612a is configured to retain at least one first wire 14a and each second channel 2612b is configured to retain at least one second wire 14b. As best shown in FIG. 13a, first wires 14a and second wires 14b are in a stacked arrangement. In this embodiment, second channels 2612b are generally perpendicular to first channels 2612a.

Referring to FIGS. 14a-14b, a wire management article 2702 includes a base sheet 2704 and a plurality of first wire management elements 2706 projecting from base sheet 2704. First wire management elements 2706 define a plurality of first channels 2712. Each first channel 2712 is configured to retain at least one first wire 14a. Wire management article 2702 further includes a cover sheet 2716 and a plurality of second wire management elements 2718 projecting from cover sheet 2716. Second wire management elements 2718 define a plurality of second channels 2724. Each second channel 2724 is configured to retain at least one second wire 14b. In this embodiment, second channels 2724 are generally perpendicular to first channels 2712. Cover sheet 2716 is releasably attached to base sheet 2704 by interlocking first wire management elements 2706 and second wire management elements 2718.

A wire management article according to an aspect of the present invention may be configured to be releasably attached to a wiring duct. Wiring ducts are wire management products that have come into prominent general use in recent years because of their convenience in channeling, selectively routing and retaining the various wires of a wire bundle interconnecting, e.g., the components of an electrical system. These ducts are typically channel-shaped and may have solid side walls, side walls including a plurality of round holes, or upstanding fingers constituting slotted side walls. They may have a cover for retaining the wires in the duct after completion of the wiring. Examples of wiring ducts that can be used in the present invention are available under the product categories Corner Wiring Duct, Wide Slot Wiring Duct, Narrow Slot Wiring Duct, Round Hole Wiring Duct, Solid Wall Raceway, and Flexible Wiring Duct, all from PANDUIT Corp., Tinley Park, Ill., U.S.A.

Figure 15:
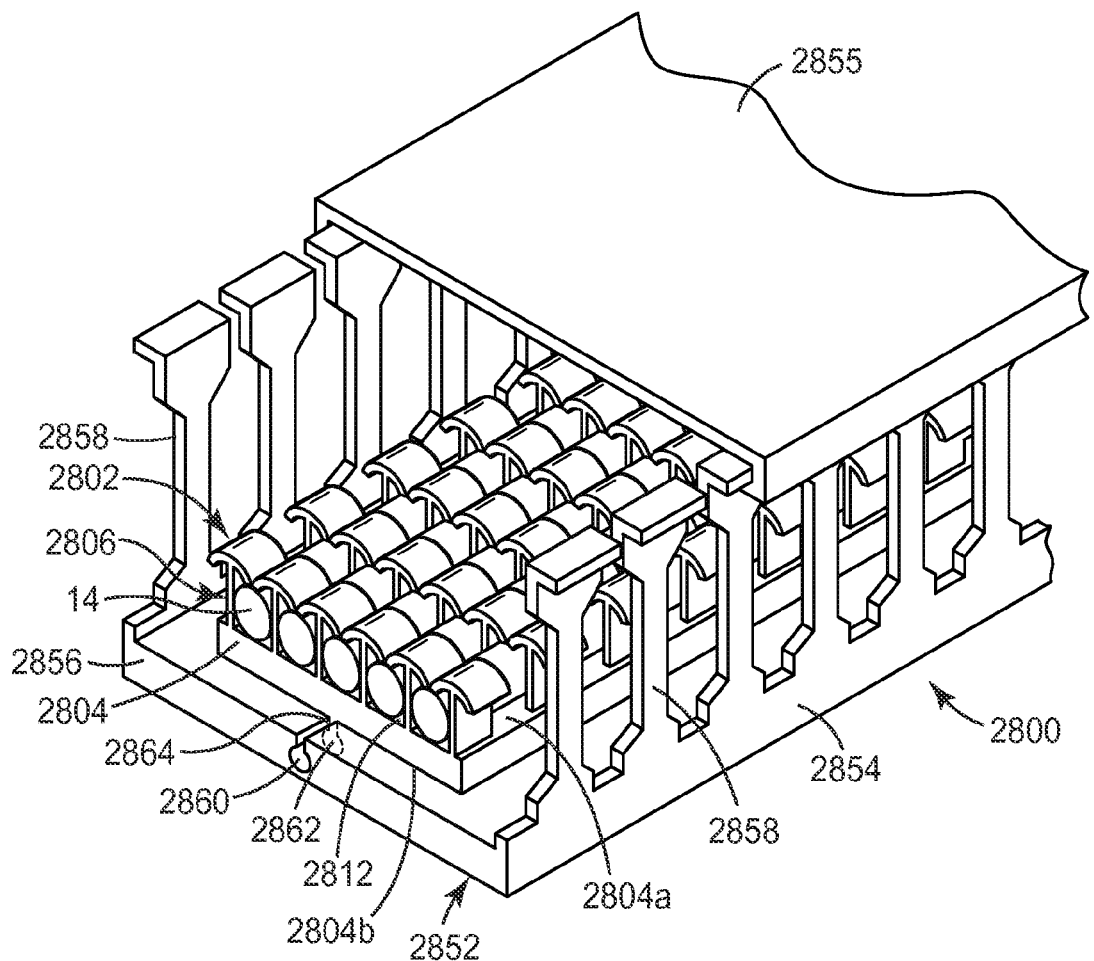
FIG. 15 is a schematic perspective view of an exemplary embodiment of a wire management system according to an aspect of the present invention including a wiring duct and a wire management article.

FIG. 15 illustrates an exemplary embodiment of a wire management system according to an aspect of the present invention. Wire management system 2800 includes a wiring duct 2852 and a wire management article 2802. Although wiring duct 2852 provides channeling, selectively routing and retaining of a group of wires, the addition of wire management article 2802 to wiring duct 2852 enables further organization, separation, protection, and ease of access and removal to a group of wires.

Wiring duct 2852 includes an elongate base member 2854 and, optionally, a cover 2855. Base member 2854 has a bottom wall 2856 and side walls 2858 extending from bottom wall 2856 and defining a channel therebetween. Bottom wall 2856 includes a groove 2860 extending along the length of base member 2854. In other embodiments, one or more grooves 2860 may be present on interior and/or exterior surfaces of bottom wall 2856, one or both side walls 2858, and/or cover 2855 as is suitable for the intended application. Side walls 2858 are slotted side walls including a plurality of upstanding fingers. In other embodiments, side walls 2858 may be solid, may include a plurality of round holes, or may have any other suitable design.

Wire management article 2802 is configured to be releasably attached to wiring duct 2852. Although in the illustrated embodiment, a single wire management article 2802 is releasably attached to bottom wall 2856 of wiring duct 2852, in other embodiments, one or more wire management articles 2802 may be releasably attached to interior and/or exterior surfaces of bottom wall 2856, one or both side walls 2858, and/or cover 2855 of wiring duct 2852, using any method/structure as is suitable for the intended application. Wire management article 2802 includes a base sheet 2804 and a plurality of wire management elements 2806. Wire management elements 2806 project from a top surface 2804a of base sheet 2804 and define a plurality of channels 2812. Each channel 2812 is configured to retain at least one wire 14. Wire management article 2802 further includes a connection element 2862 projecting from a bottom surface 2804b of base sheet 2804. In other embodiments, one or more connection elements 2862 may project from bottom surface 2804b of base sheet 2804 as is suitable for the intended application. Connection element 2862 is configured to cooperate with corresponding groove 2860 of wiring duct 2852 to releasably attach wire management article 2802 to wiring duct 2852. In other embodiments, one or more connection elements 2862 may be present on any suitable wire management article, such as, e.g., suitable wire management articles described herein, and one or more grooves 2860 may be present on any suitable wiring duct, such as, e.g., suitable wiring ducts described herein, whereby the one or more connection elements 2862 are configured to cooperate with one or more corresponding grooves 2860 to releasably attach the wire management article to the wiring duct. As shown in FIG. 15, connection element 2862 includes a connection portion 2864. In the illustrated embodiment, connection portion 2864 has a cylindrical rod shape. In other embodiments, connection portion 2864 may have a ball shape or any other suitable shape.

Wire management articles according to aspects of the present invention may be combined to form a variety of wire management systems according to aspects of the present invention. The wire management articles may be seen as modular building blocks that are capable of building a variety of wire management systems. For example, a wire management system may be built by stacking two or more wire management articles as shown in FIGS. 16a-16b and 17a-17b.

Figure 16A:
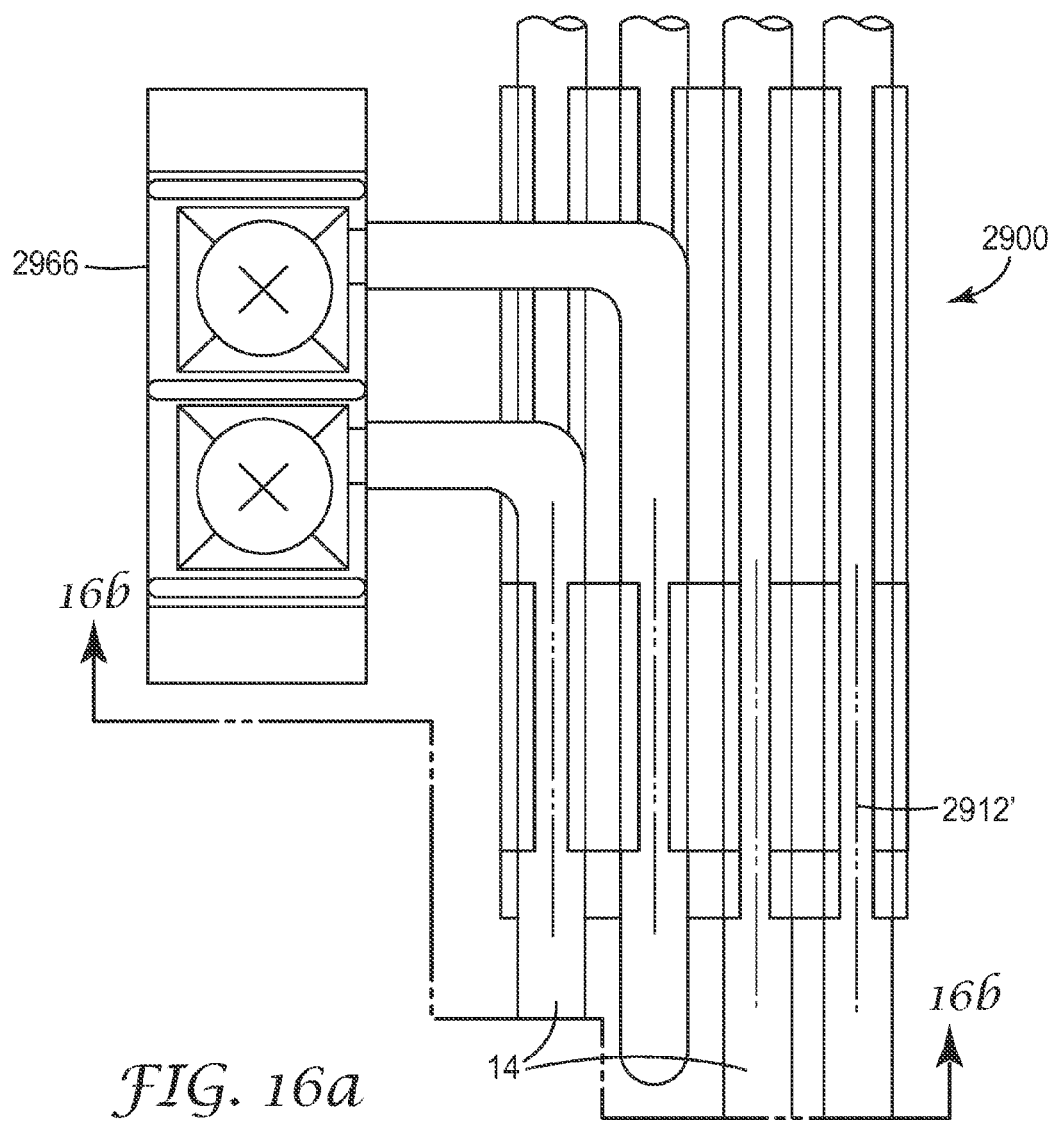
FIGS. 16*a*-16*b* and 17*a*-17*b* are schematic top and side views respectively of two other exemplary embodiments of a wire management system according to an aspect of the present invention including two wire management articles.
Figure 16B:
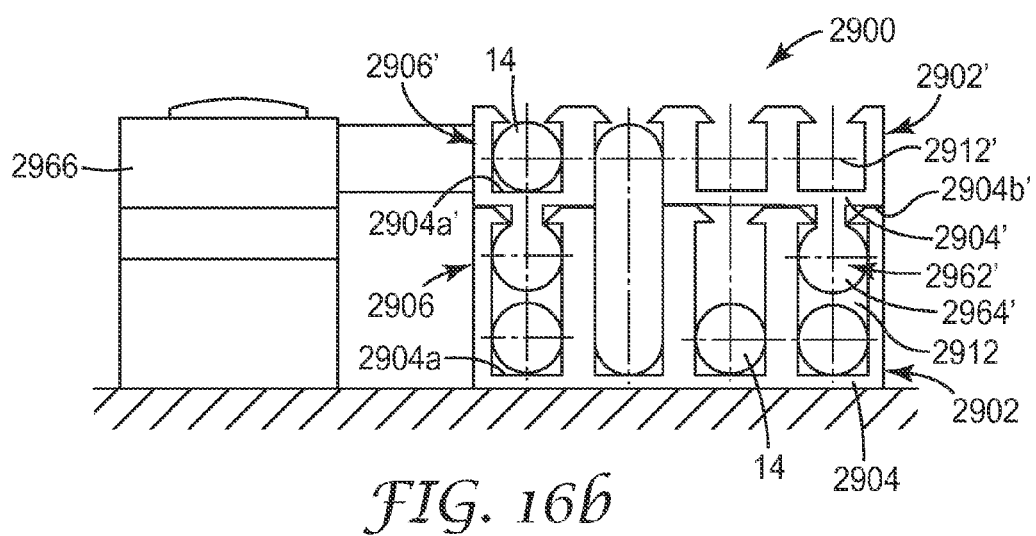

FIGS. 16a-16b illustrate an exemplary embodiment of a wire management system according to an aspect of the present invention. Wire management system 2900 includes a first wire management article 2902 and a second wire management article 2902' configured to be releasably attached to first wire management article 2902. First wire management article 2902 includes a first base sheet 2904 and a plurality of first wire management elements 2906. First wire management elements 2906 project from a top surface 2904a of first base sheet 2904 and define a plurality of first channels 2912. Each first channel 2912 is configured to retain at least one wire 14 and a connection element of second wire management article 2902', which is described below and best shown in FIG. 16b. Second wire management article 2902' includes a second base sheet 2904' and a plurality of second wire management elements 2906'. Second wire management elements 2906' project from a top surface 2904a' of second base sheet 2904' and define a plurality of second channels 2912'. Each second channel 2912' is configured to retain at least one wire 14. Second wire management article 2902' further includes two connection elements 2962' projecting from a bottom surface 2904b' of second base sheet 2904'. In other embodiments, one or more connection elements 2962' may project from bottom surface 2804b' of second base sheet 2904' as is suitable for the intended application. Connection elements 2962' are configured to cooperate with corresponding first wire management elements 2906 of first wire management article 2902 to releasably attach second wire management article 2902' to first wire management article 2902. As shown in FIG. 16b, each connection element 2962' includes a connection portion 2964'. In this embodiment, connection portions 2964' have a cylindrical rod shape and are generally parallel to second channels 2912'.

Second wire management article 2902' may be referred to as "parallel piggyback option carrier", wherein second wire management article 2902' is stacked on first wire management article 2902, and second channels 2912' are generally parallel to first channels 2912. In general, this arrangement allows wires 14 retained by second wire management article 2902' to be generally parallel to wires 14 retained by first wire management article 2902. In the illustrated embodiment, this arrangement facilitates pulling selective wires 14, such as, e.g., process control signal wires, from first wire management article 2902, routing them through second wire management article 2902', and connecting them to a terminal block 2966 without using conventional ties or clamps.

Figure 17A:
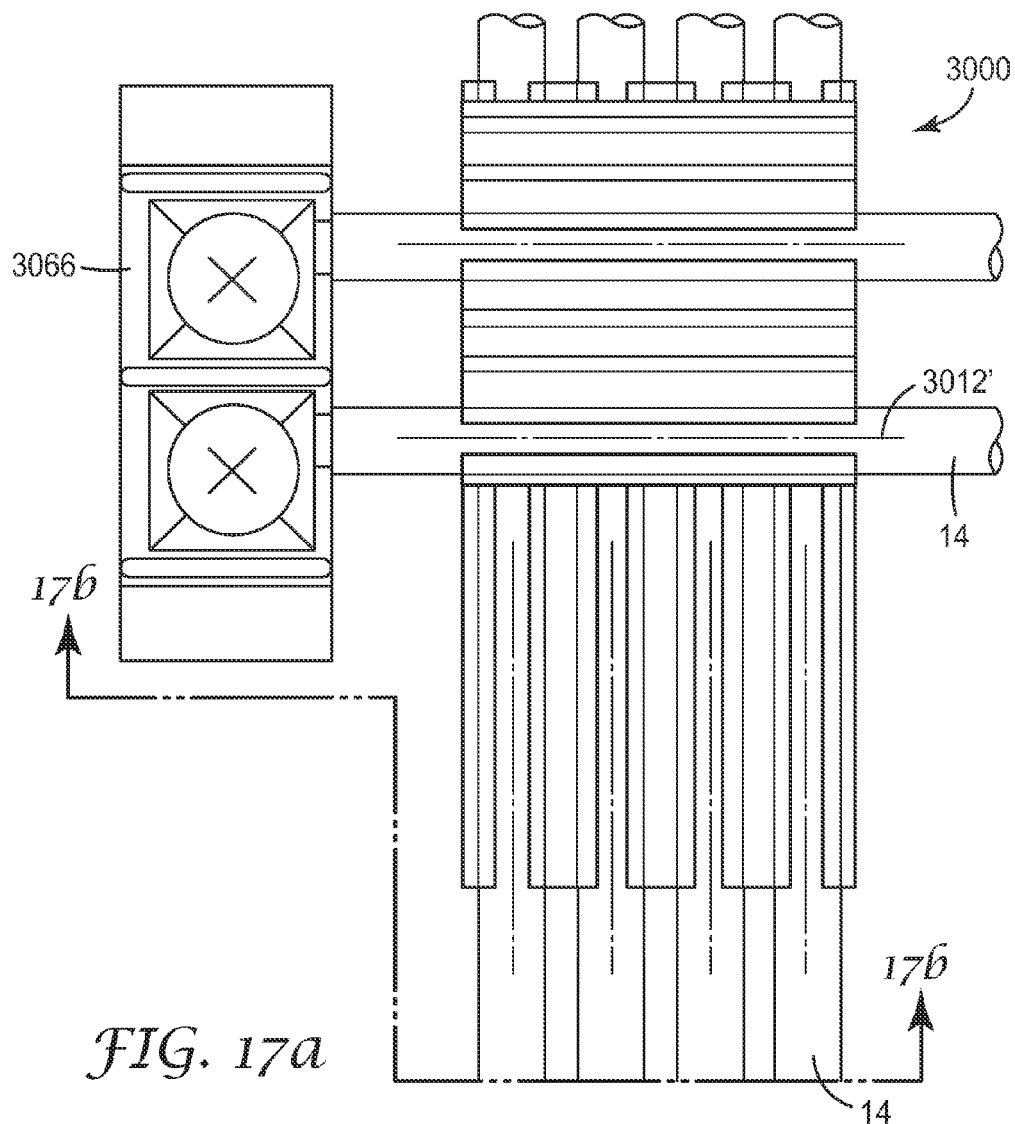
Figure 17B:
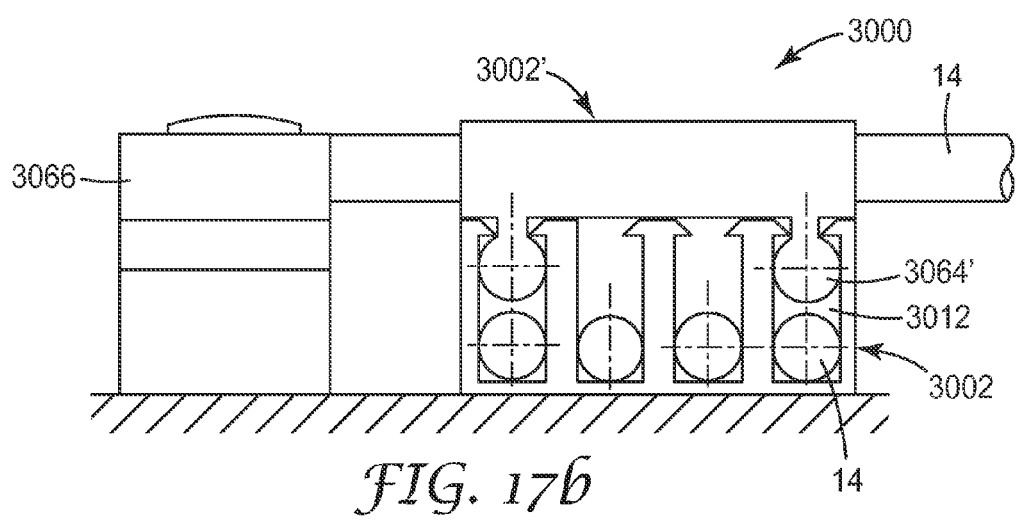

FIGS. 17a-17b illustrate another exemplary embodiment of a wire management system according to an aspect of the present invention. Wire management system 3000 is similar to wire management system 2900 illustrated in FIGS. 16a-16b. Whereas in wire management system 2900, connection portions 2964' are generally parallel to second channels 2912', in wire management system 3000, connection portions 3064' are generally perpendicular to second channels 3012'.

Second wire management article 3002' of wire management system 3000 may be referred to as "perpendicular piggyback option carrier", wherein second wire management article 3002' is stacked on first wire management article 3002, and second channels 3012' are generally perpendicular to first channels 3012. In general, this arrangement allows wires 14 retained by second wire management article 3002' to be generally perpendicular to wires 14 retained by first wire management article 3002. In the illustrated embodiment, this arrangement facilitates connecting wires 14 retained by second wire management article 3002', such as, e.g., process control signal wires, to a terminal block 3066 while mitigating transverse electromagnetic mode (TEM) influences from wires 14 retained by first wire management article 3002, such as, e.g., power transmission wires, on wires 14 retained by second wire management article 3002'.

Instead of a cylindrical rod shape, in other embodiments, connection portions 3064' may have a ball shape or any other suitable shape. Ball-shaped connection portions allow second wire management article 3002' to be placed such that second channels 3012' are generally parallel, generally perpendicular, or at any suitable angle relative to first channels 3012. A plurality of ball-shaped connection portions may be placed in an array.

Wire management articles according to aspects of the present invention may include various structures and methods to identify a single channel or wire, or a group of channels or wires retained therein.

A single channel or group of channels of a wire management article according to an aspect of the present invention may include a channel identifier to identify the location of the channel or group of channels relative to other channels or groups of channels. This allows a wire installer to quickly determine the location of a specific wire or group of wires retained in the wire management article. The channel identifier may include a color code, a character code, or a distinctive wire management element. Examples of a character code include alphabetical codes, numerical codes, and alpha-numerical codes. Examples of a distinctive wire management element include taller or wider posts/ridges. Color coding may also be used to guide the wire installer in placing the correct wire in the correct channel. For example, the channels may have substantially the same color as the corresponding wires. Alternatively, the base sheet of the wire management article may have a contrasting color (or appearance) to the wire management elements to clearly show where the wires are to be placed.

A cover sheet of a wire management article according to an aspect of the present invention may include a wire group identifier to identify a group of wires. This would allow a wire installer to quickly determine the location of a specific group of wires retained in the wire management article. In one exemplary embodiment, returning to FIG. 11a, cover sheet 1316 of wire management article 1302 includes a top surface 1316a opposite bottom surface 1316b and a wire group identifier 1368 disposed on top surface 1316a. Wire group identifier 1368 may include a direct marking, such as, e.g., writing or printing directly on top surface 1316a, or a pre-printed label.

In each of the embodiments and implementations described herein, the wire management article and elements thereof are formed of any suitable material. The materials are selected depending upon the intended application and may include both metals and non-metals (e.g., any one or combination of non-conductive materials including but not limited to polymers, glass, and ceramics). Material selection will depend upon factors including, but not limited to, chemical exposure conditions, environmental exposure conditions including temperature and humidity conditions, flame-retardancy requirements, material strength, and rigidity, to name a few.

In each of the embodiments and implementations described herein, the wire management article and elements thereof are formed by methods such as, e.g., profile extrusion or replication extrusion. Co-extrusion or other enhancements may be used in combination to provide unique material constructions that give rise to useful product characteristics. For example, interlocking wire management elements, cover sheet hinge portions, and pull tab hinge portions may be formed from an elastomeric material for enhance durability. Another co-extrusion option is to form single- or multi-colored stripes or "lanes" to more clearly identify where a wire should be located. After forming the wire management article, it may be post-processed, e.g., to change the shape of elements thereof. Example post-processes include a flame treatment or heated nip rolls to form the head portions of the wire management elements. Another example post-process includes cutting slots laterally in the elongated ridges at intervals along the length of the ridges, which may provide additional flexibility of the wire management article. After wire management articles are formed in an extruded film or sheet, an adhesive layer or backing may be attached to the film or sheet, after which the wire management articles can be singulated.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electro-mechanical, and electrical arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A wire management system for retaining a plurality of wires comprising:
   a first wire management article comprising:
      a first base sheet having a first base sheet top surface; and
      a plurality of first wire management elements projecting from the first base sheet top surface, each first wire management element comprising a first stem portion attached to and generally upright from the first base sheet and a first head portion spaced from the first base sheet top surface extending generally laterally from the first stem portion,
      wherein the plurality of first wire management elements define a first plurality of channels, at least one of the first plurality of channels defined by stem portions of two of the plurality of first wire management elements, the head portions of the two of the plurality of first wire management elements and the first base sheet top surface, wherein each of the first plurality of channels retains at least one of the plurality of wires; and a second wire management article configured to be releasably attached to the first wire management article and comprising:
      a second base sheet having a second base sheet top surface and a second base sheet bottom surface opposite the second base sheet top surface;
      a plurality of second wire management elements projecting from the second base sheet top surface, each second wire management element comprising a second stem portion attached to and generally upright from the second base sheet and a second head portion spaced from the second base sheet top surface extending generally laterally from the second stem portion,
      wherein the plurality of second wire management elements define a second plurality of channels, at least one of the second plurality of channels defined by stem portions of two of the plurality of second wire management elements, the head portions of the two of the plurality of second wire management elements and the second base sheet top surface, wherein each of the second plurality of channels retains at least one of the plurality of wires; and
      at least one connection element projecting from the second base sheet bottom surface,
   wherein the connection element of the second wire management article is configured to cooperate with a corresponding first wire management element of the first wire management article to releasably attach the second wire management article to the first wire management article.

2. The wire management article of claim 1, wherein at least one of the first plurality of channels includes a channel identifier, and optionally wherein the channel identifier is at least one of a color code, a character code, and a distinctive wire management element.

3. The wire management article of claim 1, further comprising an adhesive layer disposed on a bottom surface of the first base sheet.

* * * * *